(12) United States Patent
Chun

(10) Patent No.: US 8,346,892 B2
(45) Date of Patent: Jan. 1, 2013

(54) COMMUNICATION NETWORK SYSTEM OF BUS NETWORK STRUCTURE AND METHOD USING THE COMMUNICATION NETWORK SYSTEM

(75) Inventor: Kyoung Wook Chun, Seoul (KR)

(73) Assignee: NHN Corporation, Seongnam-si (KR)

( * ) Notice: Subject to any disclaimer, the term of this patent is extended or adjusted under 35 U.S.C. 154(b) by 1217 days.

(21) Appl. No.: 11/721,396

(22) PCT Filed: Dec. 16, 2005

(86) PCT No.: PCT/KR2005/004348
§ 371 (c)(1),
(2), (4) Date: Jun. 11, 2007

(87) PCT Pub. No.: WO2006/065100
PCT Pub. Date: Jun. 22, 2006

(65) Prior Publication Data
US 2009/0240813 A1   Sep. 24, 2009

(30) Foreign Application Priority Data
Dec. 17, 2004   (KR) .................. 10-2004-0107496

(51) Int. Cl.
*G06F 15/16* (2006.01)
*G06F 15/173* (2006.01)
(52) U.S. Cl. ...................... 709/219; 709/238
(58) Field of Classification Search .......... 709/204, 709/219, 224, 226, 227, 230, 235, 238, 250, 709/253; 719/314, 328; 340/7.3; 370/230, 235, 412–418, 428–429; 710/39, 52–54, 56, 112
See application file for complete search history.

(56) References Cited

U.S. PATENT DOCUMENTS

| | | | |
|---|---|---|---|
| 6,732,175 B1 | 5/2004 | Abjanic | |
| 6,757,291 B1 | 6/2004 | Hu | |
| 2002/0052968 A1* | 5/2002 | Bonefas et al. | ............... 709/231 |
| 2003/0101265 A1 | 5/2003 | Dantzig et al. | |
| 2005/0021622 A1* | 1/2005 | Cullen | ......................... 709/204 |

FOREIGN PATENT DOCUMENTS

| | | |
|---|---|---|
| JP | 2003-324468 | 11/2003 |
| KR | 10-2004-0010038 | 1/2004 |

* cited by examiner

*Primary Examiner* — Peling Shaw
(74) *Attorney, Agent, or Firm* — H.C. Park & Associates, PLC

(57) ABSTRACT

Disclosed is a communication network system in a bus network structure, the system including: a broker processing a message routing; a connector; and a plurality of services connected to the broker via the connector, wherein: the service is a communicable terminal node and each of the plurality of services is connected to the broker via one connector, the connector is a module for mediating a connection between the service and the broker, each connector connected to only one broker, and the broker is a module for setting up a routing path or the connection with the connector, and to process the message routing, all brokers connected to each other in a full mesh topology.

14 Claims, 23 Drawing Sheets

PRIOR ART

FIG. 7
MRHeader
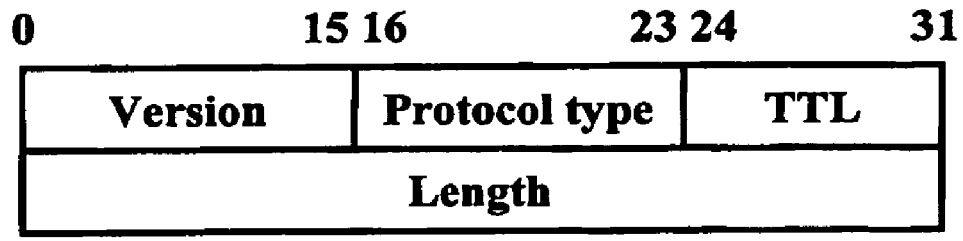
MRMSGHeader
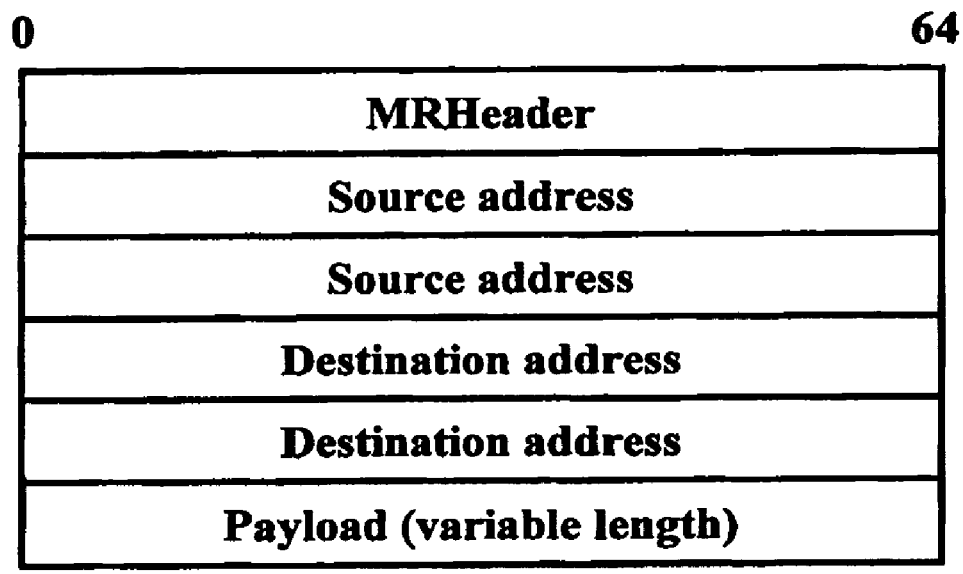
MRCMPHeader
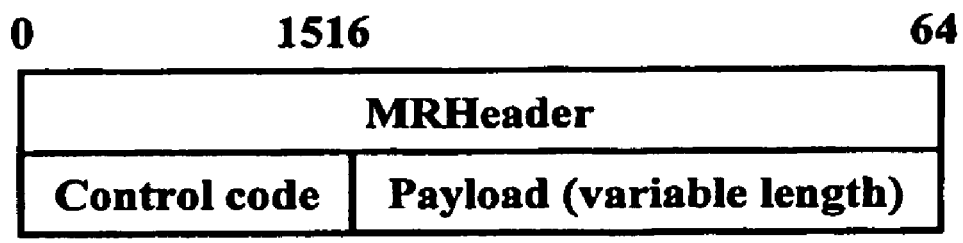

COMMUNICATION NETWORK SYSTEM OF BUS NETWORK STRUCTURE AND METHOD USING THE COMMUNICATION NETWORK SYSTEM

CROSS REFERENCE TO RELATED APPLICATIONS

This application is a U.S. National Phase Application of International Application PCT Application No. PCT/KR2005/004348 filed on Dec. 16, 2005, which claims the benefit of priority from Korean Patent Application No. 10-2004-0107496 filed on Dec. 17 2004. The disclosures of International Application PCT Application No. PCT/KR2005/004348 and Korean Patent Application No. 10-2004-0107496 are incorporated herein by reference.

TECHNICAL FIELD

The present invention relates to a communication network system in a bus network structure and a data transmitting/receiving method using the same, and more particularly, to a communication network system and a data transmitting/receiving method using the same, in which a bus network structure connects at least one service contained in one process to a broker processing a message routing via one connector and connects all brokers of a network to each other in a full mesh topology, and a connection structure between services is simplified via the bus network structure.

BACKGROUND ART

In the conventional art, all game servers providing game service are connected to each other in a mesh topology. FIG. 1 is a diagram illustrating network connections between game servers according to the conventional art.

According to the conventional art illustrated in FIG. 1, every time new game servers are added, there is a surprising increase in a number of connections from the viewpoint of the entire network. FIG. 2 is a diagram illustrating network connections between game servers which may occur as a number of game servers continuously increases in the conventional art.

According to the conventional art in which game servers are connected to each other with mesh topology, as described above, when a number of game servers increases, the connection structure thereof also becomes very complicated. As a result, a game server may not be able to be extended according to an increase of game users. Also, when a connection between game servers is globally extended, the management thereof also becomes difficult.

The more a number of partner servers connect to one server, the more the total number of connections geometrically increases. Generally, in the conventional art, one game server is connected to a login server, a ranking server, and a database server. In this instance, the game server is additionally grouped with a channel list server and a notice server as one multicast group. Accordingly, a substantial number of connections in the entire network greatly exceeds a number of connections between game servers. Also, its management is very difficult.

Consequently, a new communication network structure which can deviate from a network structure according to the conventional art connecting all game servers in a mesh topology, simplify and easily manage a connection structure between servers, and efficiently extend services is needed.

DISCLOSURE OF INVENTION

Technical Goals

The present invention is conceived to solve the aforementioned problems in the conventional art, and the present invention provides a communication network system and a data transmitting/receiving method using the same, which can simplify a connection structure between servers by using a bus network structure and support service extendibility and performance extendibility, and also can easily maintain and manage the connection structure.

The present invention also provides a communication network system and a data transmitting/receiving method using the same, which can suggest a new communication structure that can deviate from a network structure according to the conventional art connecting all game servers in a mesh topology, simplify and easily manage a connection structure between servers, and efficiently extend services.

Technical Solutions

To achieve the above objectives and solve the aforementioned problems in the conventional art, according to an embodiment of the present invention, there is provided a communication network system including: a broker processing a message routing; a connector; and a plurality of services connected to the broker via the connector, wherein: the service is a communicable terminal node and each of the plurality of services is connected to the broker via one connector, the connector is a module for mediating a connection between the service and the broker, each connector connected to only one broker, and the broker is a module for setting up a routing path or the connection with the connector, to process the message routing, all brokers connected to each other in a full mesh topology.

According to an aspect of the present invention, there is provided a communication network system, in which the connector includes: an Application Programming Interface (API) exposing a function provided by the connector to the service; a message queue management module managing a transmitted/received Message Routing Protocol (MRP) packet, the MRP packet being a unit of data transmitted/received between the connector and the broker; a service pool management module registering the service in the broker or removing the service from the broker, and managing the registered service; a service management module managing information on the registered service; and a connection management module transmitting/receiving the MRP packet and managing a socket connection with the broker.

According to another aspect of the present invention, there is provided a communication network system, in which the broker includes: a link management module maintaining and managing a connection with the connector or other brokers, and transmitting/receiving data with the connector or other brokers; a routing information management module maintaining and managing routing information of a service registered in the broker; a message division module understanding a type of data received in the link management module and dividing the received data into a simple message and a complex message according to a predetermined standard; a message router receiving the simple message from the message division module, obtaining location information of a destination associated with the simple message, from the routing information management module, and transferring the obtained location information to the link management module; a message deserializer receiving the complex message from the message division module and converting the received complex message into an object; a message transactor receiving the object from the message deserializer and controlling the broker by using the object; a message serializer receiving the object from the message transactor, processing the object into transmittable linear data, and transferring the same to the link management module; and an automatic configurator tracking a status of a network containing the broker and automatically adjusting the status of the broker.

According to an embodiment of the present invention, there is provided a method for transmitting/receiving data by using a communication network system in a bus network structure, in which the communication network system includes a broker processing a message routing, a connector, and a plurality of services connected to the broker via the connector, and the method includes the steps of: connecting all brokers of the communication network system to each other in a full mesh topology, the broker being a module for setting up a routing path or a connection with the connector to process the message routing; connecting the connector to the broker, the connector being a module for mediating the connection between the broker and at least one service contained in one process, each connector connected to only one broker; registering the service in the broker via the connector, the service being a communicable terminal node, each service connected to the broker via one connector; and transmitting/receiving data between the registered services via the connector and the broker.

BRIEF DESCRIPTION OF DRAWINGS

FIG. 7 is a diagram illustrating a format of a message used in a communication network system according to the present invention;

BEST MODE FOR CARRYING OUT THE INVENTION

Hereinafter, a communication network system and a data transmitting/receiving method using the same according to the present invention will be described in detail with reference to the accompanying drawings.

Figure 3:
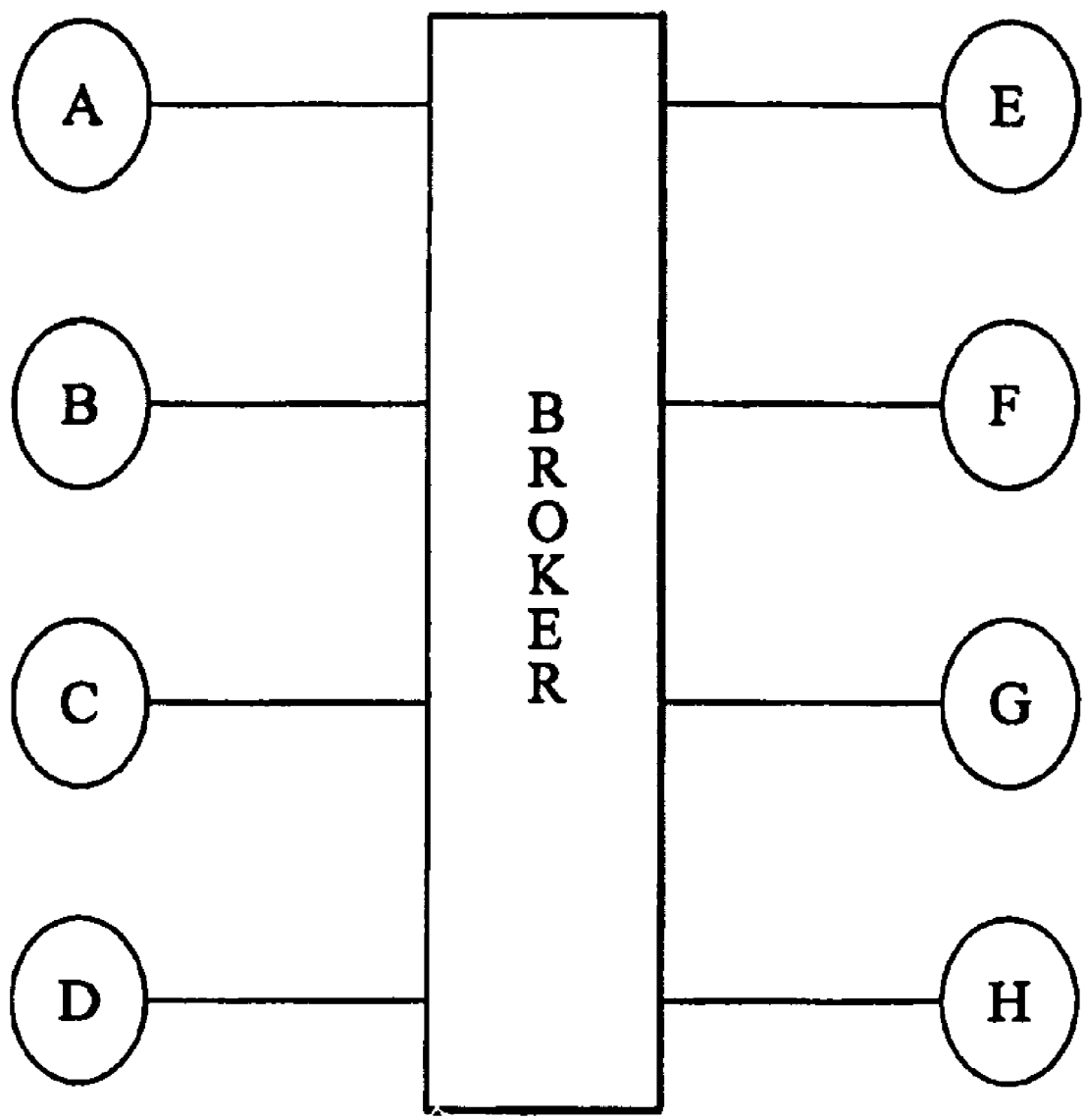
FIG. 3 is a schematic diagram illustrating a bus network structure according to the present invention.

FIG. 3 is a schematic diagram illustrating a bus network structure according to the present invention.

Figure 1:
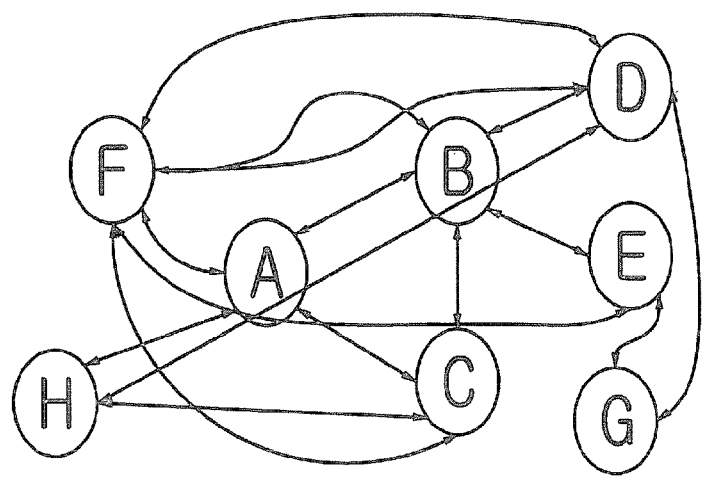
FIG. 1 is a diagram illustrating network connections between game servers according to conventional art.

As illustrated in FIG. 1, in the conventional art, all game servers are connected to each other in a mesh topology. However, in the bus network structure according to the present invention, as illustrated in FIG. 3, all servers are connected to each other in a bus structure. Accordingly, the connection structure between servers is very simplified.

Figure 4:
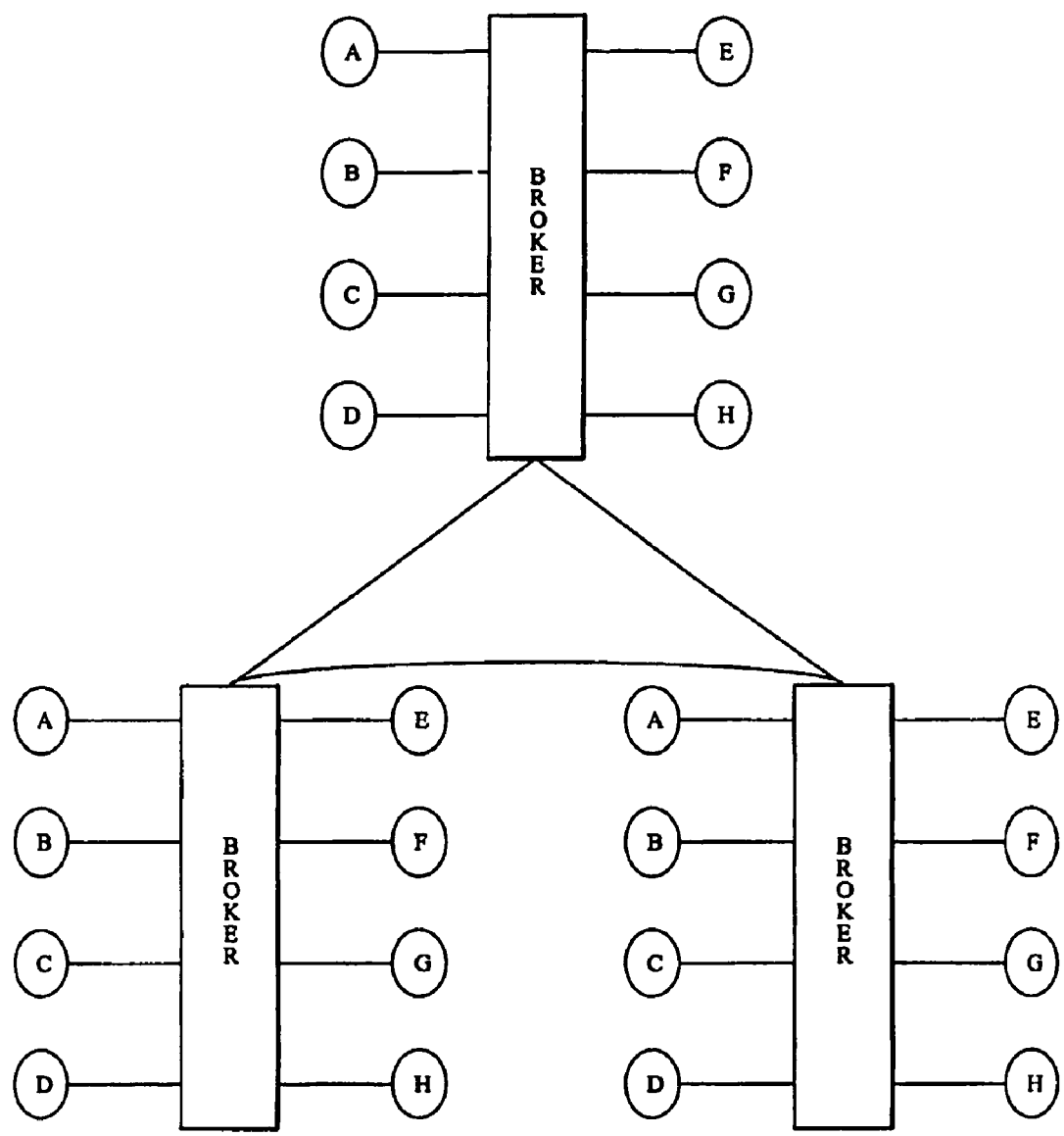
FIG. 4 is a schematic diagram illustrating a connection of a communication network system in a bus network structure according to the present invention.

FIG. 4 is a schematic diagram illustrating a connection of a communication network system in a bus network structure according to the present invention.

Figure 2:
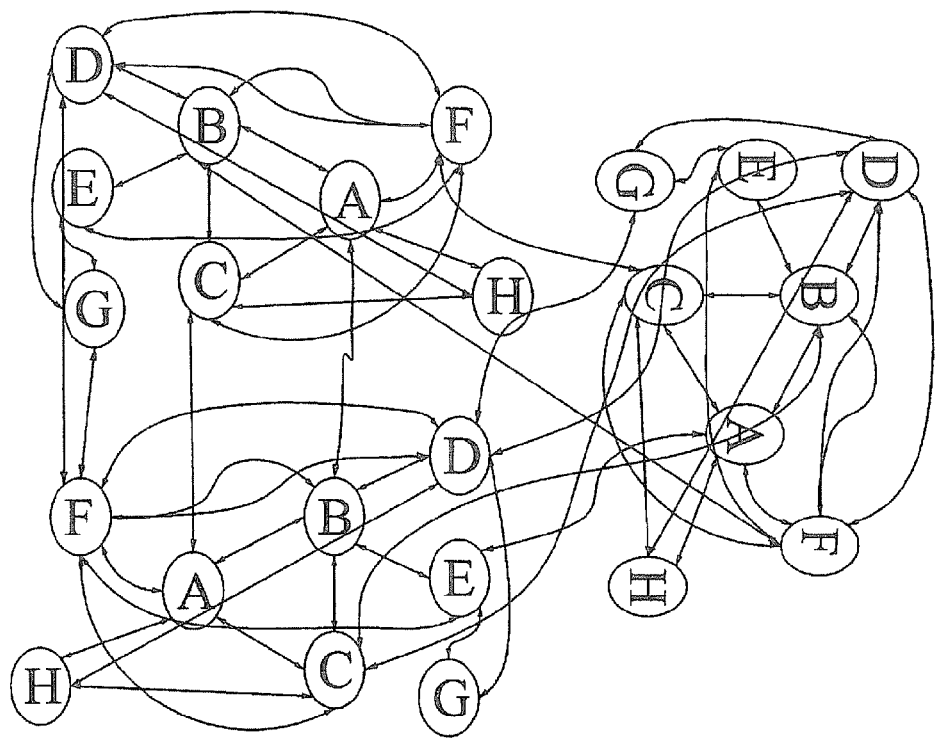
FIG. 2 is a diagram illustrating network connections between game servers which may occur as a number of game servers continuously increases in the conventional art.

According to the conventional art illustrated in FIG. 1, as illustrated in FIG. 2, every time new game servers are added, there is a surprising increase in a number of connections from the viewpoint of the entire network. On the other hand, as illustrated in FIG. 4, in the bus network structure according to the present invention, each server maintains a connection with one broker. Also, in the case of extending the network, an intermediate connection is performed via brokers. Accordingly, although a server is additionally connected, a number of connections is not significantly increased from the viewpoint of the entire network. Accordingly, the communication network system adopting the bus network structure of the present invention, as illustrated in FIGS. 3 and 4, may easily link a new service and also may easily maintain and manage the linked service.

Figure 5:
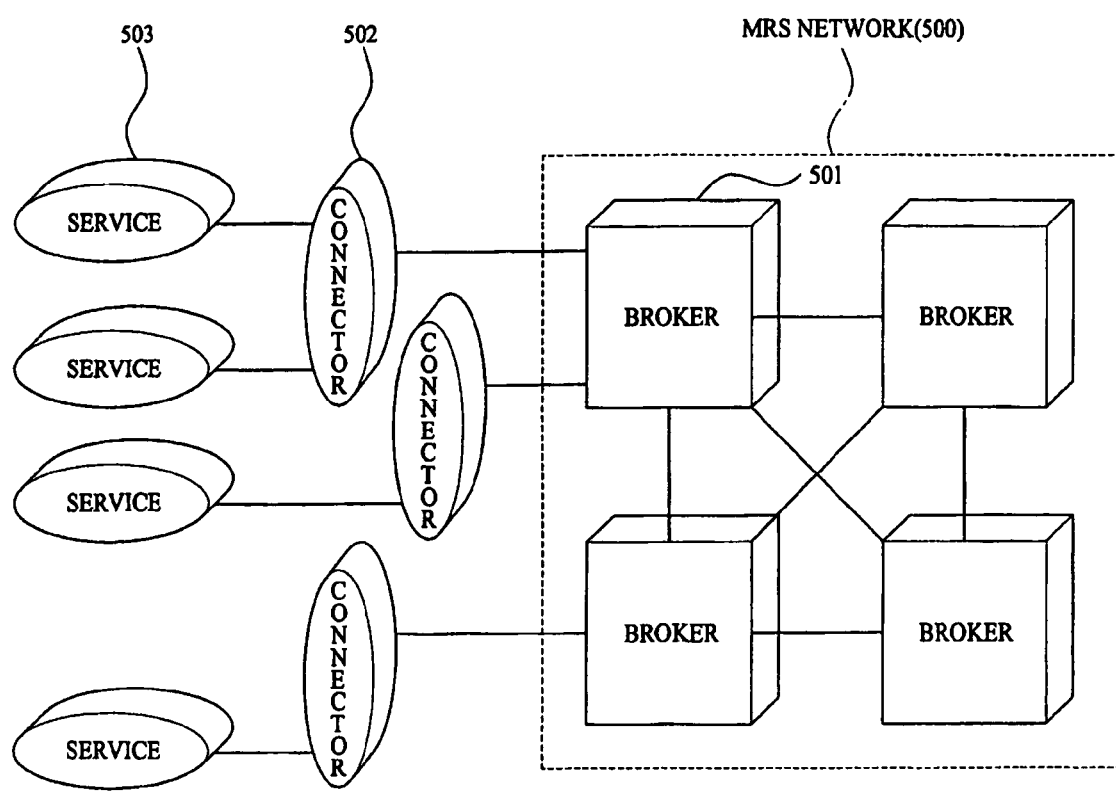
FIG. 5 is a diagram illustrating a connection of a broker, a connector, and a service in a communication network system according to the present invention.

FIG. 5 is a diagram illustrating a connection of a broker, a connector, and a service in a communication network system according to the present invention.

As illustrated in FIG. 5, the communication network system according to the present invention includes a broker 501 processing a message routing, a connector 502 and a plurality of services 503 connected to the broker 501 via the connector 502.

The service 503 is a communicable terminal node. Each service 503 is connected to the broker 501 via one connector 502. Also, the connector 502 is a module for mediating a connection between the broker 501 and the service 503. Each connector 502 is connected to only one broker 501.

According to an embodiment of the present invention, the connector 502 and the service 503 are contained in an identical process. Only one connector 502 is contained in one process and at least one service 503 is contained in one process. Namely, only one connector 502 exists for each process. Also, the connector 502 may mediate a connection between all services 503 and the broker 501. In this instance, all services 503 exist in a process containing the connector 502.

According to the present embodiment, a connector and a process are matched 1:1. Accordingly, a communication network system may be unified. Also, inefficient routing, which may occur when connecting the services 503 contained in different processes to the same broker 501 via one connector 502, may be prevented. Also, complexity in transmitting/receiving data may be prevented.

The broker 501 is a module for setting up a routing path or the connection with the connector 502 to efficiently process the message routing. The brokers 501 are connected to each other in a full mesh topology.

In the present specification, a network formed by connecting the brokers 501 in a full mesh topology is defined as a message routing server (MRS) network 500. Accordingly, the MRS network 500 is a network service platform for efficiently transmitting/receiving a message between various types of communication systems. The connector 502 is a module for providing a programming interface for transmitting/receiving a message by using the MRS network 500. The service 503 utilizes the MRS network 500 via the programming interface provided by the connector 502.

As illustrated in FIG. 5, in the communication network system according to the present invention, there is only one effective connection between the broker 501 and the connector 502. In the case of communicating with the broker 501, each service 503 sequentially communicates with the broker 501 via said only one connection.

Figure 6:
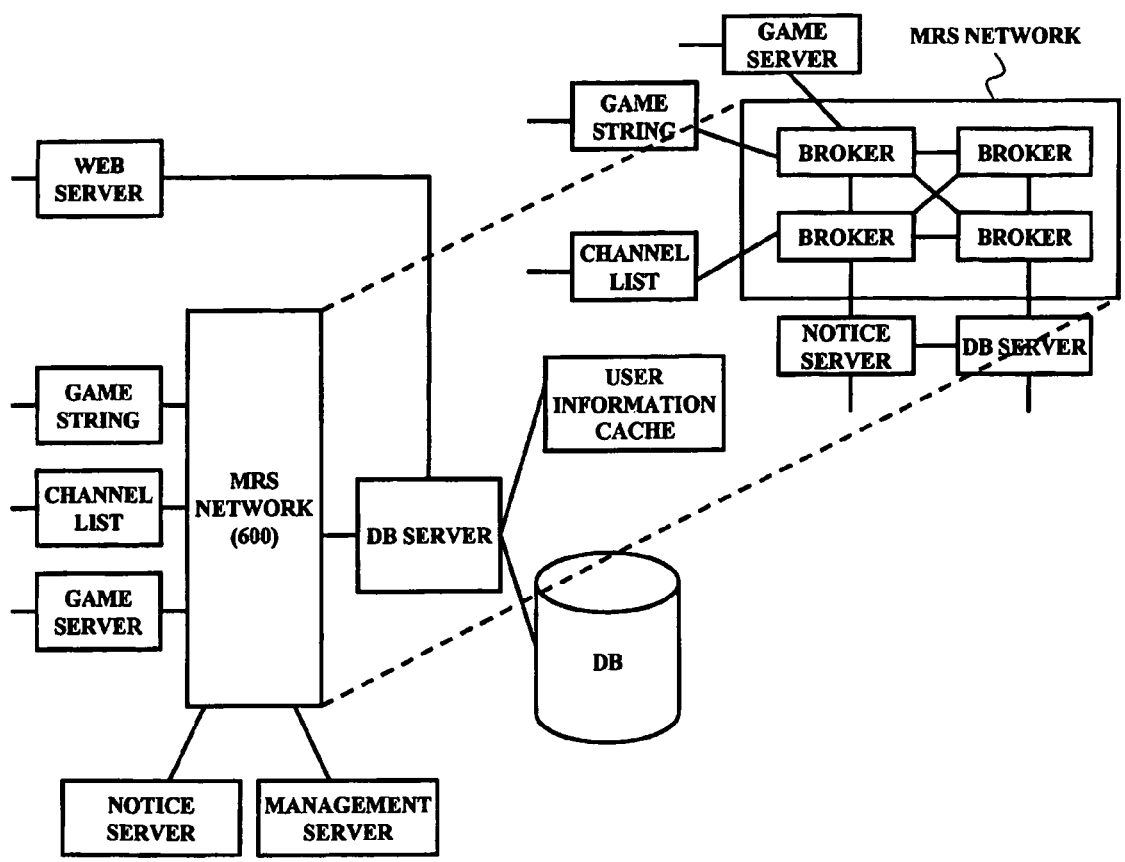
FIG. 6 is a diagram illustrating an example of various types of servers connected to each other via a message routing server (MRS) network according to the present invention.

FIG. 6 is a diagram illustrating an example of various types of servers connected to each other via an MRS network according to the present invention.

As illustrated in FIG. 6, various types of game related servers such as a game string server, a channel list server, a game server, a notice server, a management server, a database server, etc., are connected to each other via an MRS network 600. Each server maintains only one connection with any one of a plurality of brokers which are connected to each other in a full mesh topology.

In the conventional art, all game related servers are connected to each other in a full mesh topology. Accordingly, the more a number of partner servers connected to one server, the more the total number of connections geometrically increases. On the other hand, according to the present invention, as illustrated in FIG. 6, each server maintains a connection with only one broker. Also, in the case of extending the network, an intermediate connection is performed via brokers. Accordingly, although a server is additionally connected, a number of connections is not significantly increased in the viewpoint of the entire network.

FIG. 7 is a diagram illustrating a format of a message used in a communication network system according to the present invention. Referring to FIG. 7, the format of transmitting/receiving a message between a connector and a broker, and between brokers, which are subsystems of the communication network system according to the present invention, will be described.

In the present specification, the structure of the message will be described based on a data type which is widely used in windows, rather than an octet notation, as a data type for defining a field of each message. In this case, windows data type and octet notation is mapped, such as "BYTE: octet(8)", "WORD: octet(16)", and "DWORD: octet(32)".

Messages used in the communication network system according to the present invention are grouped into MRMSGHeader and MRCMPHeader. Each message is divided into fields, of which one is a common field containing MRHeader, and remaining fields are specified fields of each message.

MRHeader is message header information that all messages exchanged in the communication network system, according to the present invention, should contain as a common field. An MRHeader message may not be used alone. The MRHeader message must be transmitted/received after inserting a valid value in a protocol type field and appending additional message information to the MRHeader.

TABLE 1

| Type | Name | Description |
| --- | --- | --- |
| WORD | Version | Indicates version information of a message. Indicates a major version in an upper byte and a minor version in a lower byte. |
| BYTE | Protocol type | This value may contain two values, PT_MESSAGE and PT_MRCMP. PT_MESSAGE gives notice that fields coming after MRHeader is in an MRMSGHeader format. Also, PT_MRCMP gives notice that fields coming after MRHeader is in an MRCMPHeader format. |
| BYTE | TTL | This means time to live. A message transmitted/received in a communication network according to the present invention decrements a TTL value by one every time a broker of an MRS network processes routing, and in the case of the TTL value being 0, does not process routing and generates a transmission error. |
| DWORD | Length | Means the length of MRHeader and MRMSGHeader coming thereafter, in other words, the length of the entire message containing MRCMPHeader. |

A transferred message in the MRMSGHeader format has a structure for transferring a payload value designated by a service between a plurality of services connected to an MRS network.

In this case, a source address and a destination address are described in the message transmitted/received in the format of MRMSGHeader. The source address is an address of a transmitter transmitting a message and the destination address is an address of a receiver receiving the message. Also, the MRS network tries routing on the basis of connection information and the destination address. Each field will be described in Table 2 below.

TABLE 2

| Type | Name | Description |
|---|---|---|
| MRHeader (8 bytes) | Not defined | The aforementioned MRHeader structure. |
| MRADDRESS (16 bytes) | Source address | An address of a message transmitter. Also, MRADDRESS is a data type for defining a source address and destination address field of the MRMSGHeader. |
| MRADDRESS (16 bytes) | Destination address | An address of a message receiver. |
| Not defined | Not defined | A user defined message. The length in an MRHeader format of a corresponding message has to contain the total length from MRHeader through a payload defined by a user. |

A transferred message in the format of MRCMPHeader is a message defined for transmitting/receiving a signal between a connector and a broker, and between brokers. In this instance, the connector and the broker are subsystems of the communication network system according to the present invention. Each field win be described in Table 3 below.

TABLE 3

| Type | Name | Description |
|---|---|---|
| MRHeader (8 bytes) | Not defined | The aforementioned MRHeader structure. |
| WORD | Control code | A signal command to be transmitted/received. An upper byte functions to divide a role of the signal and a lower byte functions as a divider in dividing the purpose. |
| Not defined | Not defined | A field for adding variable length associated with a control code. This field may be transformed into various lengths according to the content of the control code. |

Hereinafter, an address system used in the present invention will be described.

In the case of designating a source address and a destination address to transmit/receive data using an MRS network, the present invention utilizes a new address system according to the present invention, not an IP address. The MRS network supports three types of addresses, which are unicast, anycast, and multicast, to identify a particular service. Each address is in the form of a cast type and an address in any one of the three address types, and has the length of 16 bytes.

In the case of an online game, a plurality of service instances interacts and communications between the service instances also increase. However, in the conventional art, a network address is not allocated to the service instances. Namely, one process having an identical network address contains many service instances and processes a large number of communications between service instances.

Accordingly, the present invention utilizes a new address system, allocates a single address to each service instance and efficiently processes a communication between service instances. In this case, a game server does not need to distribute messages to each of a plurality of game centers. Accordingly, management cost may be significantly reduced.

Also, the present invention supports three types of addresses, such as unicast, anycast and multicast. Accordingly, anycast or multicast may be applied to group instances operating in physically separated servers as one anycast or multicast group.

Figure 8:
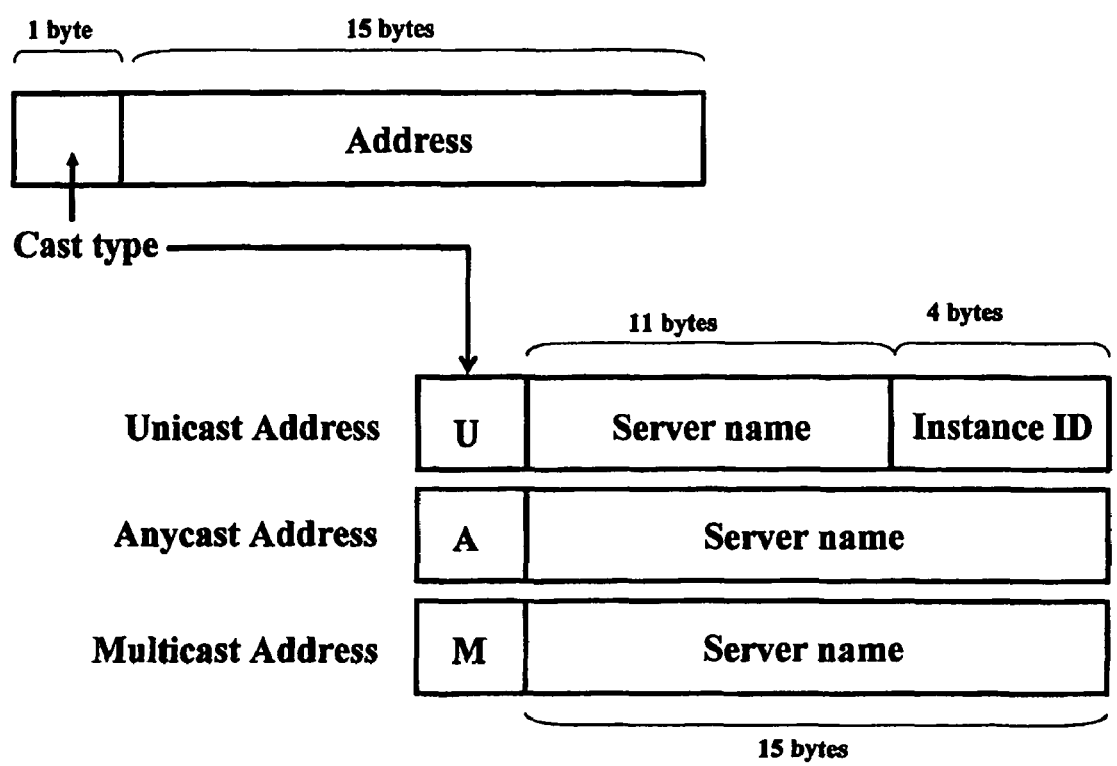
FIG. 8 is a diagram illustrating an address system according to the present invention.

FIG. 8 is a diagram illustrating an address system according to the present invention.

In FIG. 8, a cast type is the type of an address and has one value from among CT-UNICAST, CT_MULTICAST and CT_ANYCAST.

The unicast address is a unique address capable of identifying all services using an MRS network. Also, the unicast address is in the form of a server name and an instance ID. In this instance, the server name identifies a server activating a particular service in the entire network. The instance ID uniquely identifies a corresponding service in the same server.

The server name is a unique value of 11 bytes indicating a computer hardware server in which a service using the MRS network is activated. A server name may be a unique value of 11 bytes identifying a server, in which a service is activated, within the entire network.

The instance ID is a unique identifier identifying a service in the same server. As an example, values of 1 to 65535 are reserved for when a fixed unicast address is required. Values after 65536 may be dynamically allocated and used within the server.

The unicast address described above may be arranged as Table 4 below.

TABLE 4

| Type | Name | Description |
|---|---|---|
| BYTE | Cast type | In the case of a unicast address, always CT_UNICAST. |
| DWORD | Instance ID | In the case of requiring a plurality of addresses in a corresponding computer, each address may be separated by using an instance No. 0x0000 to 0xffff as reserved numbers for the instance ID. |
| BYTE (x11) | Server name | An identifier capable of identifying a corresponding computer. Generally, a NetBIOS name of a local computer may be used as a server name. Accordingly, all computers using an MRS network should have a computer name which can be distinguished from other computers, and of which the length should be within 11 bytes. |

The multicast address and anycast addresses simply utilize a 15 byte length value. Accordingly, the multicast and anycast addresses may be readily set up and utilized between services. This value should be a unique value in the entire network and also known in advance.

The multicast/anycast address may be arranged as Table 5 below.

TABLE 5

| Type | Name | Description |
|---|---|---|
| BYTE | Cast type | In the case of a multicast address, defined as CT_MULTICAST. Also, in the case of an anycast address, defined as CT_ANYCAST. |
| BYTE (x15) | Service Name | An identifier capable of identifying a corresponding service. Multicast and anycast addresses do not designate a computer or a service, but are a virtual address system. Also, the service name is a unique value that can be identified in the entire MRS network. |

Examples of using an MRS network according to the present invention may include (1) the case of a service accessing the MRS network to utilize a function of other services and (2) the case of a service accessing the MRS network to provide a function of processing a matter requested from other services.

As an example of (1) the case of a service accessing the MRS network to use a function of other services, there may be a service sending a request to a login server to confirm user login information and receiving a response thereto. The service for utilizing a function provided by other services operates as shown below, via a connector which is a module for mediating the MRS network and the service.

Initially, when starting a process, a programming interface is initialized to transmit/receive data between the service and a connector. After registering a unicast address of the service in the MRS network, the service sends a request message to other services and receives a response message therefrom. Also, in the case of completing the use of the function provided by other services, the unicast address of the service is removed from the MRS network. When ending the process, the programming interface is also terminated.

As an example of (2) the case of a service accessing the MRS network to provide a function of processing a matter requested from other services, there may be a service providing a database reference function and a service providing a user's login information or location information. The service for providing a particular function to other services operates as shown below, via a connector which is a module for mediating the MRS network and the service.

Initially, when starting a process, a programming interface is initialized to transmit/receive data between the service and a connector. After registering a unicast address of the service in the MRS network, the service joins an anycast or multicast address with respect to a function to be provided. Also, the service receives a request message from other services and sends a response message thereto. Also, in the case of completing providing of the particular function to another service, the service leaves the joined anycast or multicast address. The unicast address of the service is removed from the MRS network. When ending the process, the programming interface is also terminated.

As described above, in the present invention, a connector may cause a service to register a unicast address thereof in an MRS network and join an anycast or multicast address according to a function to be provided, and also cause the service to leave the joined anycast or multicast address in the case of termination of the service.

Hereinafter, a data transmitting/receiving method supported in an MRS network according to the present invention will be described.

A method of transmitting/receiving unicast data will be described.

Figure 9:
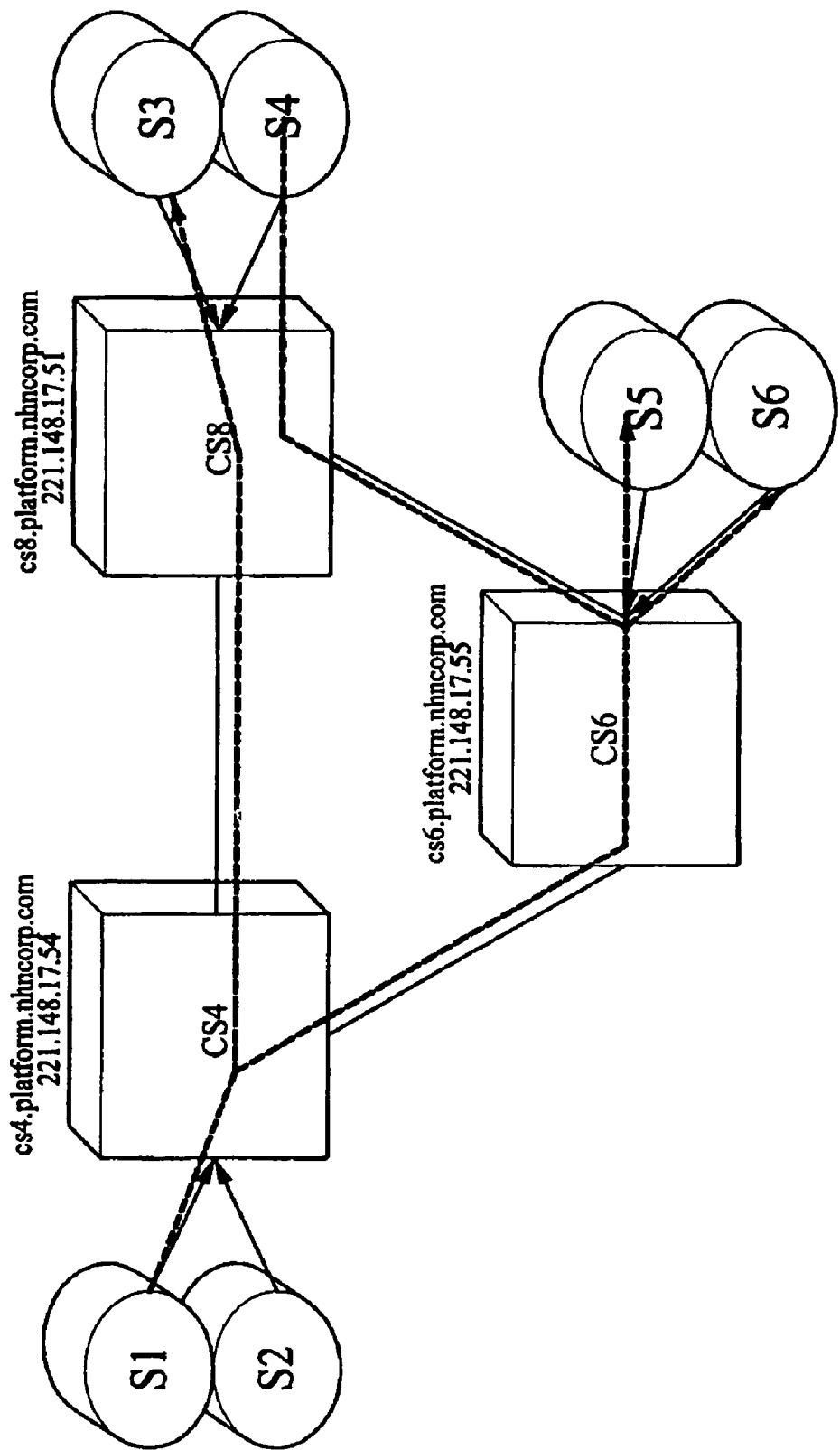
FIG. 9 is a diagram illustrating a unicast data processing method according to an embodiment of the present invention.

FIG. 9 is a diagram illustrating a unicast data processing method according to an embodiment of the present invention. In FIGS. 9 to 12, S1 is a service joined in neither an anycast nor a multicast address. S2, S4 and S6 are services joined in an anycast address. Also, S3 and S5 are services joined in a multicast address.

As illustrated in FIG. 9, the MRS network according to the present invention may transmit data from a unicast address of a source to a unicast address of a destination. Also, all unicast addresses registered in the MRS network may receive data from a unicast address of a physically separated area. As described above, to transmit or receive unicast data, the unicast address of the source is registered in the MRS network. Also, the unicast address of the destination registered in the MRS network is known.

Figure 10:
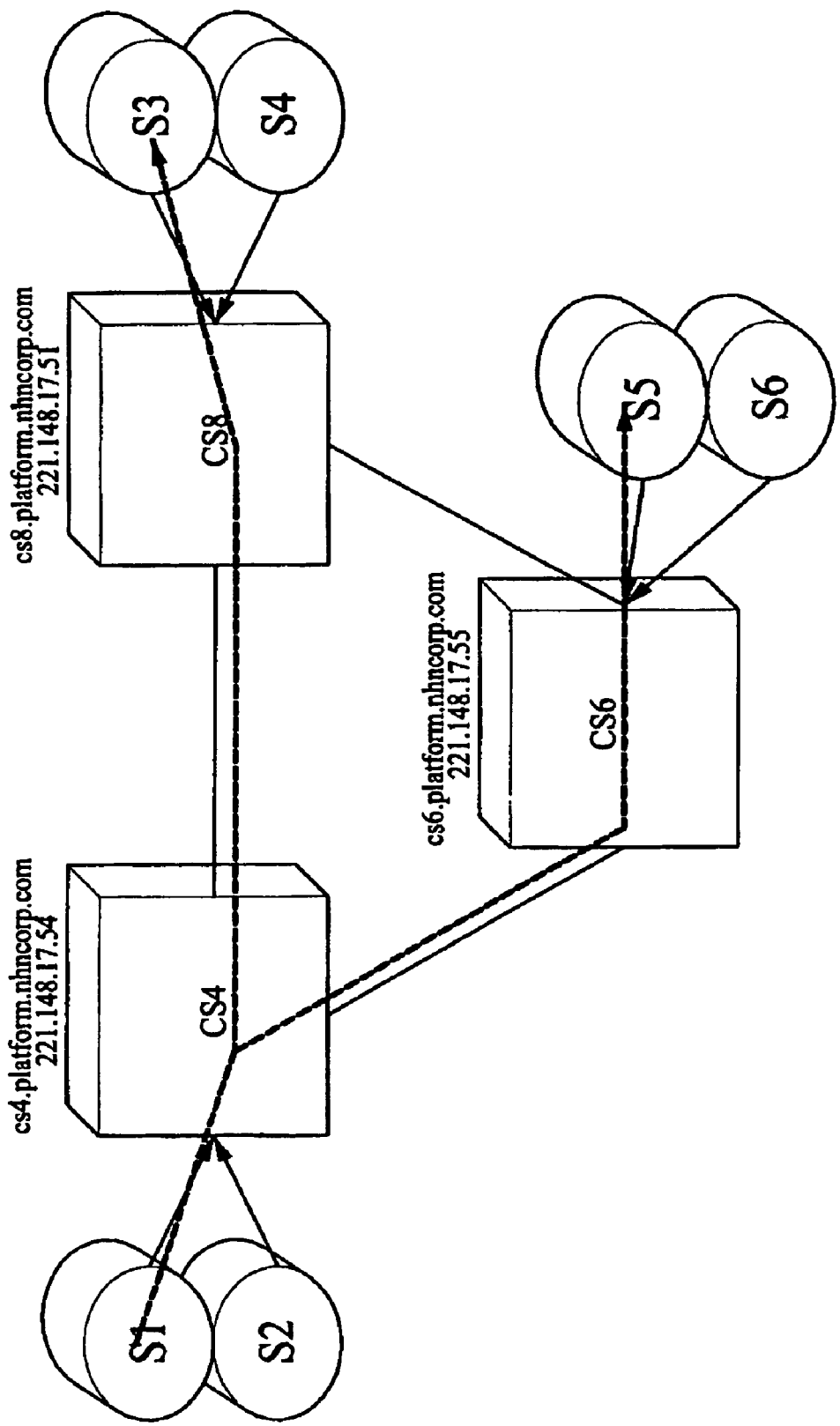
FIG. 10 is a diagram illustrating a multicast data processing method according to an embodiment of the present invention.

FIG. 10 is a diagram illustrating a multicast data processing method according to an embodiment of the present invention.

As illustrated in FIG. 10, the MRS network according to the present invention may transmit data from a unicast address of a source to a multicast address of a destination. When an address of the destination is a multicast address, the MRS network transmits data to all unicast addresses joined in the multicast address. FIG. 10 illustrates a process of transmitting data from S1 of a unicast address to S3 and S5 of a multicast address. As described above, to transmit multicast data, the unicast address of the source is registered in the MRS network. Also, the multicast address of the destination joined in the MRS network is known.

As S3 and S5 in FIG. 10, in order to receive desired data transmitted to a multicast address, the unicast address registered in the MRS network has to be joined in the multicast address. When a joining procedure is completed, data transmitted to the joined multicast address may be received.

Figure 11:
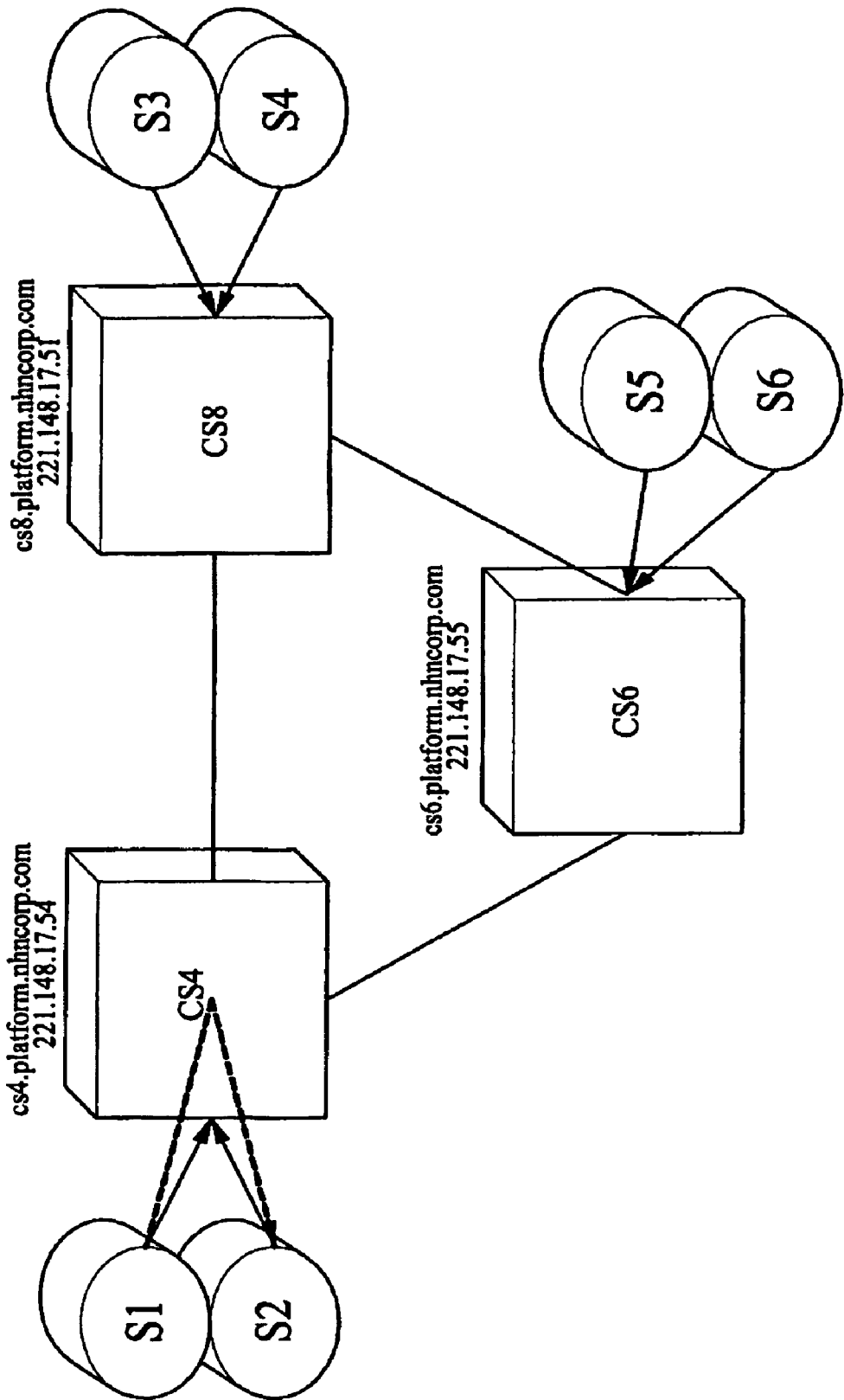
FIGS. 11 and 12 are diagrams illustrating an anycast data processing method according to an embodiment of the present invention.
Figure 12:
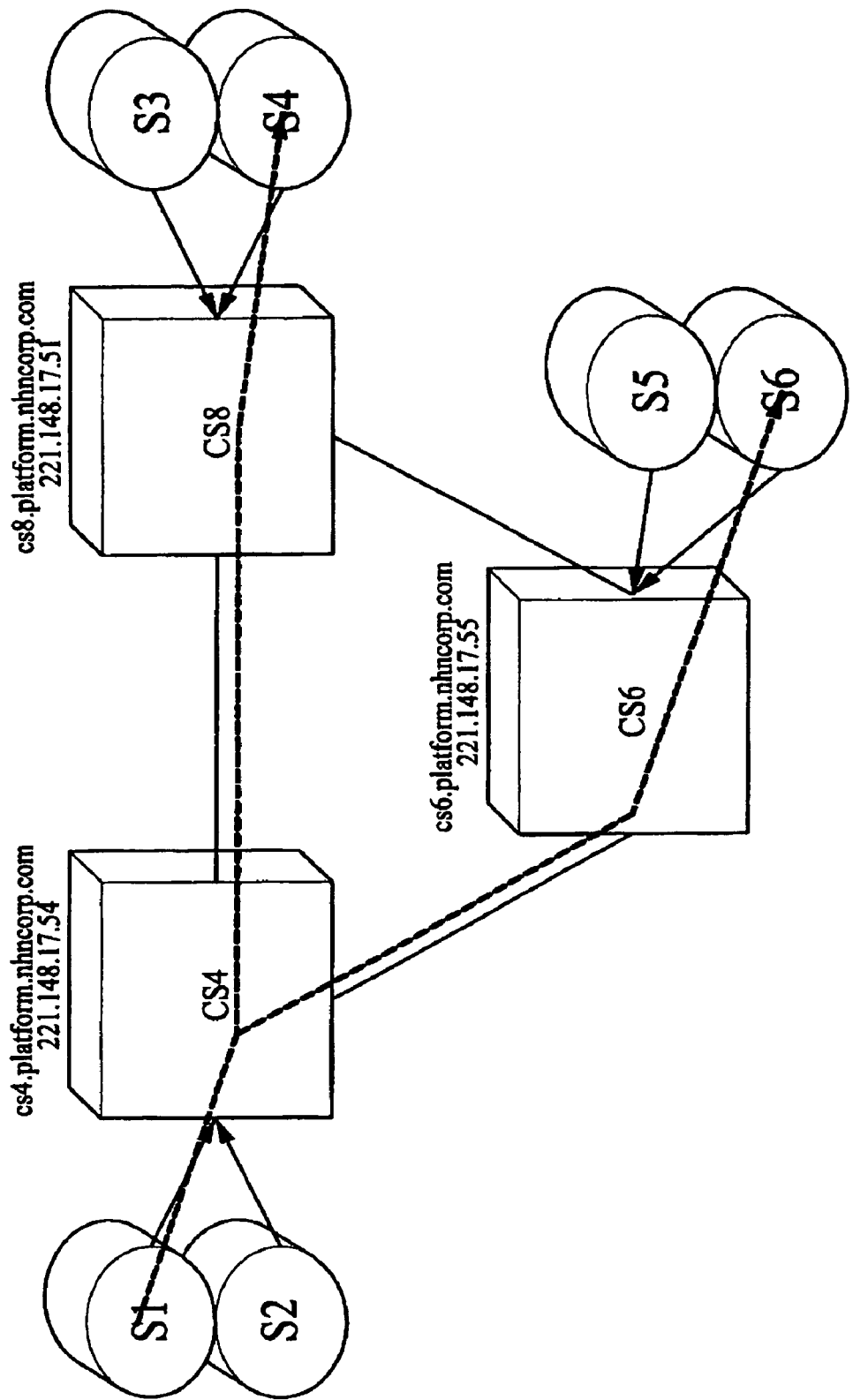

FIGS. 11 and 12 are drawings illustrating an anycast data processing method according to an embodiment of the present invention.

As illustrated in FIGS. 11 and 12, the MRS network according to the present invention may transmit data from a unicast address of a source to a multicast address of a destination. When an address of the destination is an anycast address, data is transmitted by selecting any one of unicast addresses joined in the anycast address. As described above, to transmit anycast data, the unicast address of the source is registered in the MRS network. Also, the anycast address of the destination joined in the MRS network is known.

According to an embodiment of the present invention, a broker in an MRS network receiving an anycast address operates, in the case of having a unicast address directly connected to the broker among unicast addresses joined in the anycast address, to transmit data to the unicast address. Also, in the case of not having a unicast address directly connected to the broker, the broker may randomly select an address to receive data via other brokers connected in a full mesh topology.

Referring to FIG. 11, according to the present embodiment, a broker CS4 receives the anycast address from S1 and transmits data to S2 which is directly connected to the broker CS4, among S2, S4 and S6 joined in the anycast address. In this case, a routing length may be significantly reduced.

If S2 is a service not joined in the anycast address, according to the present embodiment, the broker CS4 receives the anycast address from S1 and transmits data to S6 which is an anycast address connected to other broker CS6 or to S4 which is also an anycast address connected to other broker CS8. This is illustrated in FIG. 12.

According to the present embodiment, fast routing becomes possible by processing anycast data as described above. Also, natural load balancing may be embodied without an L4 switch.

As S2, S4 and S6 in FIGS. 11 and 12, to receive desired data transmitted to an anycast address, a unicast address registered in the MRS network has to be joined in the anycast address. When a joining procedure is completed, data transmitted to the joined anycast address may be received.

Hereinafter, an operation process of a service, a connector and a broker which are subsystems of a communication network system according to the present invention will be described with reference to FIGS. 13 to 19.

Figure 13:
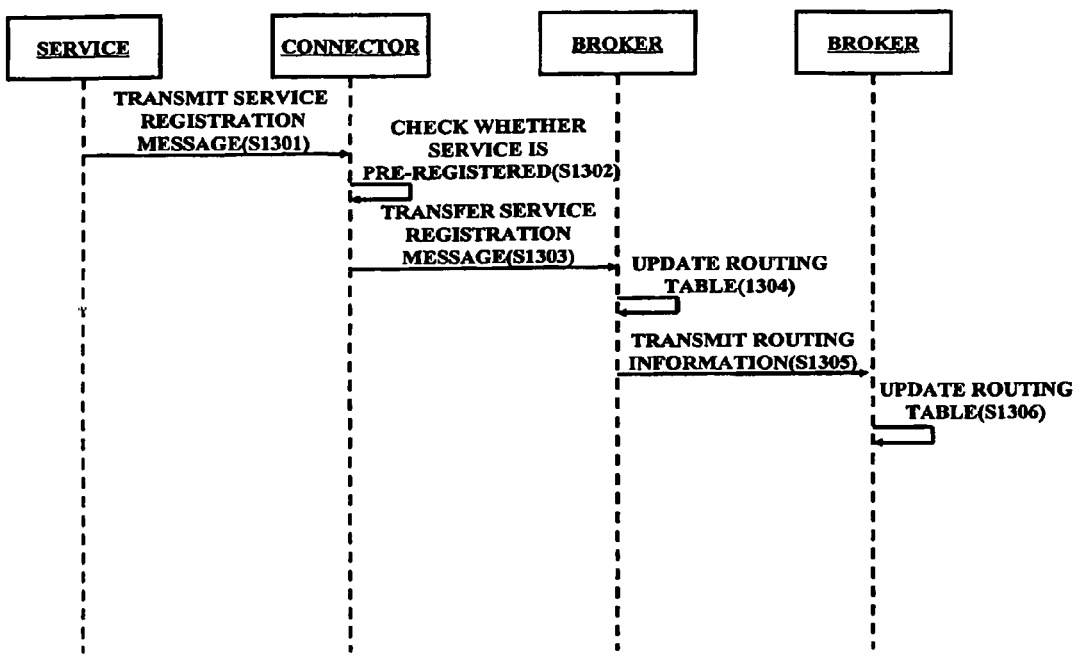
FIG. 13 is a flowchart illustrating a service registration process according to an embodiment of the present invention.

FIG. 13 is a flowchart illustrating a service registration process according to an embodiment of the present invention. A system that wants to provide or use a particular service in a communication network system according to the present invention has to register in the system itself in an MRS network via its connector.

In step S1301, a service transmits a service registration message to a connector. In step S1302, the connector analyzes the service registration message to check whether the same is a pre-registered service. In step S1303, in the case of the service not pre-registered, the connector transfers the service registration message to a broker.

In step 1304, the broker adds routing information of the service having transmitted the service registration message, to its routing table. Also, in step 1305, the broker transmits the routing information to other brokers. In step 1306, other brokers update its routing information by using the received routing information.

As described above, in the present invention, a broker, in the case of updating its routing table, may transmit the updated routing information to other brokers constructing the MRS network and cause other brokers to maintain latest routing information at all times.

Figure 14:
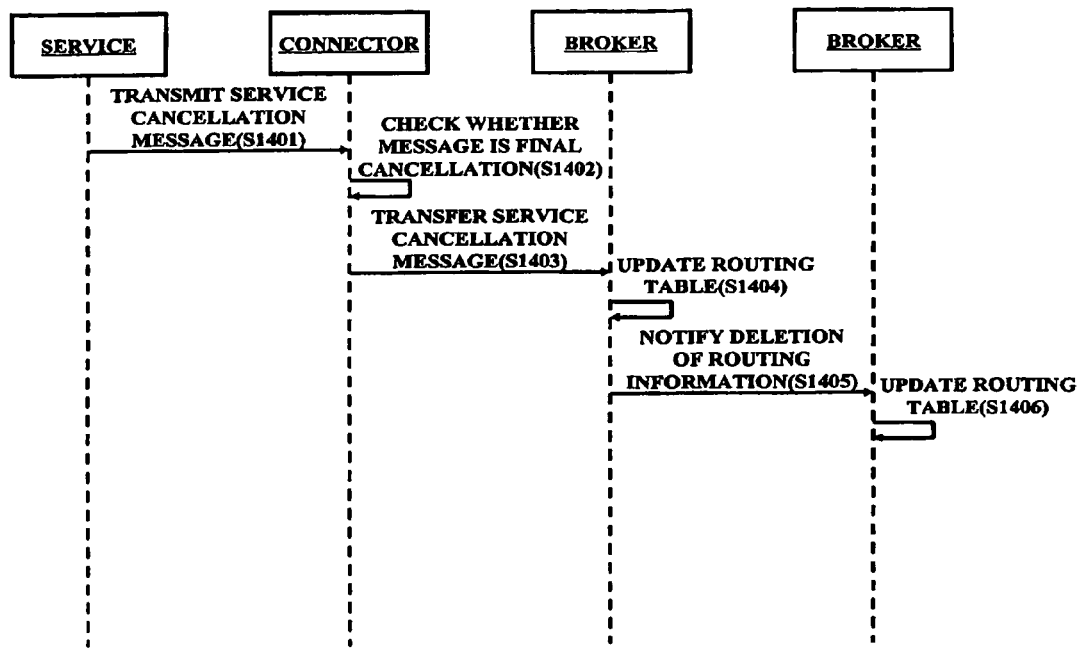
FIG. 14 is a flowchart illustrating a service cancellation process according to an embodiment of the present invention.

FIG. 14 is a flowchart illustrating a service cancellation process according to an embodiment of the present invention. A system that has registered in the system itself in an MRS network performs a service cancellation process via a connector, to remove the system itself from the MRS network. After performing the service cancellation process, all service requests via the MRS network are blocked.

In step 1401, a service transmits a service cancellation message to a connector. In step 1402, the connector analyzes the service cancellation message to check whether the same is a final cancellation. In step 1403, in the case of the final cancellation, the connector transfers the service cancellation message to a broker.

In step S1404, the broker deletes routing information of the service having transmitted the service cancellation message, from its routing table and updates its routing table. In step S1405, the broker notifies other brokers of deletion of the routing information. In step S1406, other brokers receive the notice, detect deletion of the routing information, and update their own routing table.

Figure 15:
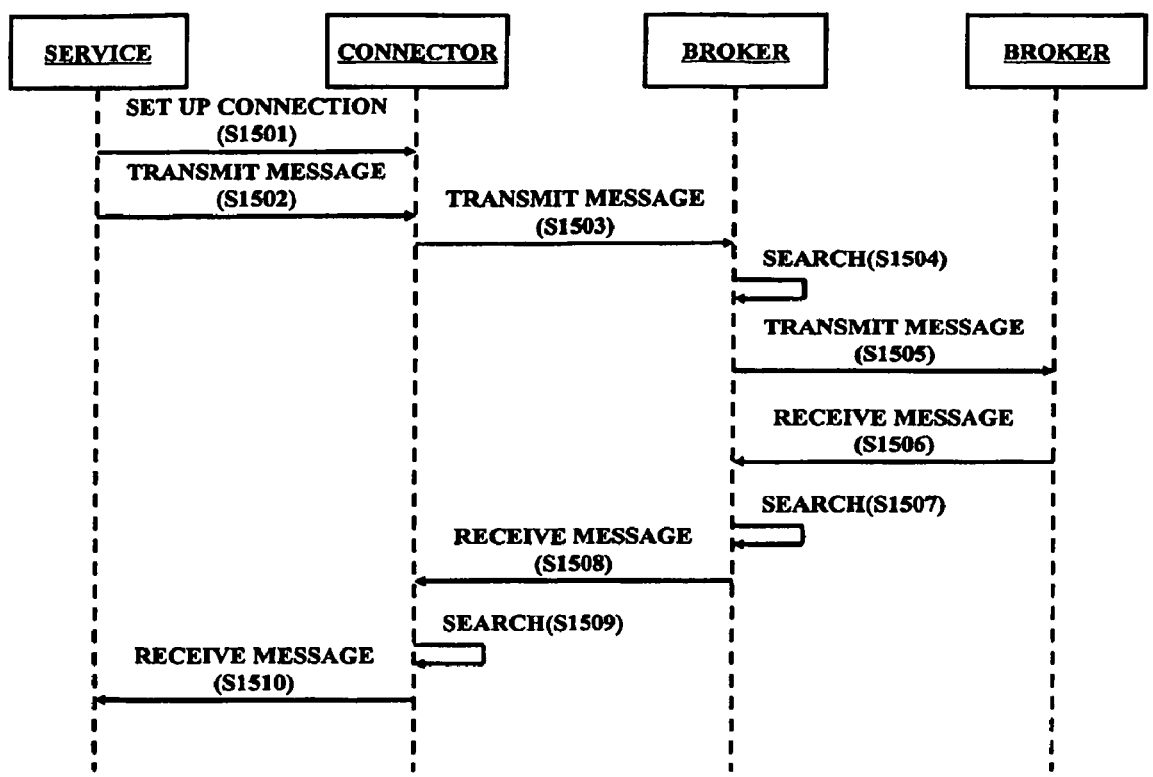
FIG. 15 is a flowchart illustrating a message transmitting/receiving process according to an embodiment of the present invention.

FIG. 15 is a flowchart illustrating a message transmitting/receiving process according to an embodiment of the present invention. Namely, FIG. 15 illustrates a process of transmitting a message to a service to utilize the service, or receiving a message which requests a service.

In step S1501, a service that wants to utilize a particular service transfers a connection message to a connector, and sets up a virtual connection with the connector. In this case, an address of a desired service is designated.

In step S1502, the service transmits a message by using a programming interface of the connector. In step S1503, the connector adds a Message Routing Protocol (MRP) Header according to MRP to the message transmitted from the service and transmits a corresponding message to a broker connected to the connector. In this instance, MRP is used in the MRS network. In step S1504, the broker searches for a destination of the message received from the connector. In step S1505, the broker transmits the message to a corresponding broker or a corresponding connector.

In step S1506, the broker receives a message from another broker. In step S1507, the broker searches for a destination of the received message. In step S1508, the broker transmits the message to a corresponding connector. In step S1509, the connector removes the MRP Header from the transmitted message and searches for a destination address and instance of the transmitted message. In step S1510, the message is transmitted to a corresponding service and the corresponding service receives the message.

In a communication network system according to the present invention, messages transferred to a broker via a connector through the aforementioned process are transparently transmitted/received to other brokers or connectors. Also, in the communication network system, a message transferred by a particular service may be transparently transmitted/received via a routing path, between brokers provided in the routing path.

Figure 16:
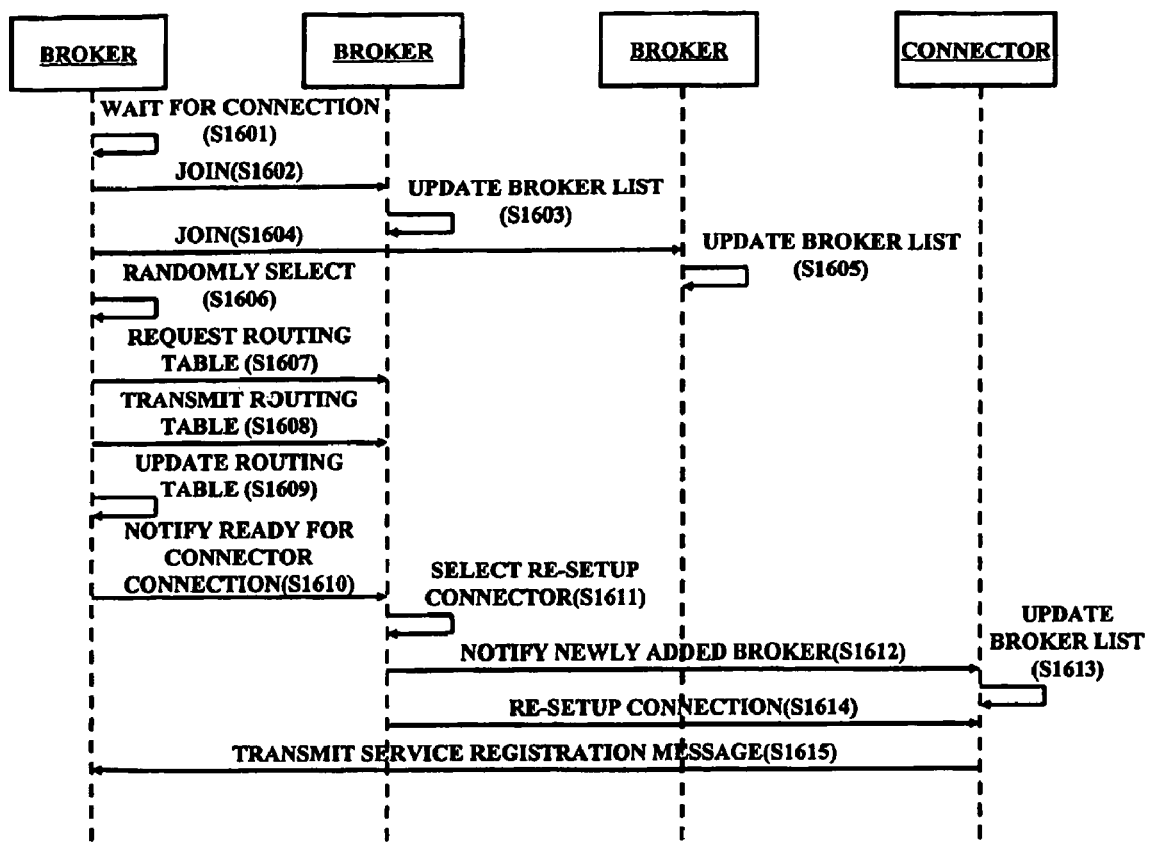
FIG. 16 is a flowchart illustrating a process of adding a new broker in an MRS network, in an embodiment of the present invention.

FIG. 16 is a flowchart illustrating a process of adding a new broker in an MRS network, in an embodiment of the present invention.

In step S1601, an additional broker is waiting for other brokers to be connected first. In step S1602, the broker is connected to other brokers that are being implemented. In step S1603, brokers connected to the additional broker add the same to their broker list and update the same. In the same manner, in step S1604, the additional broker is connected to other brokers that are being implemented. In step S1605, broker lists of the other brokers are also updated. As described above, broker lists of all brokers that are being implemented in the MRS network may be updated.

In step S1606, the additional broker is connected to all brokers that are being implemented, and randomly selects any one of the brokers. In step S1607, the additional broker requests the selected broker for a routing table and, in step S1608, receives the same. In step S1609, the additional broker reflects the received routing table to its routing table. In step S1610, the additional broker notifies other brokers that the additional broker itself is ready for a connection with a connector.

In step S1611, a broker receives the notice and counts a number of re-setup connectors to be moved to the new broker among its connectors connected to the broker and selects the same number of connectors as the counted number. Also, in step S1612, the broker having received the notice notifies all connectors connected to the broker itself that the new broker has been connected. In step S1613, all connectors having received the notice add the new broker to a broker list recording brokers connected to the broker itself.

In step S1614, a message informing to re-setup a connection with the new broker is transferred to the selected re-setup connectors. In step S1615, the connectors having received the message are connected to the new broker and transfer a service registration message with respect to services connected to the connectors, to the new broker.

The steps of S1610 to S1615 may be performed with respect to all brokers that are being implemented in the MRS network. Also, through the aforementioned process, a certain portion of connectors connected to a broker that is being implemented and services connected to the connectors may be moved to the additional broker in the MRS network. Accordingly, load may be efficiently distributed between brokers.

Figure 17:
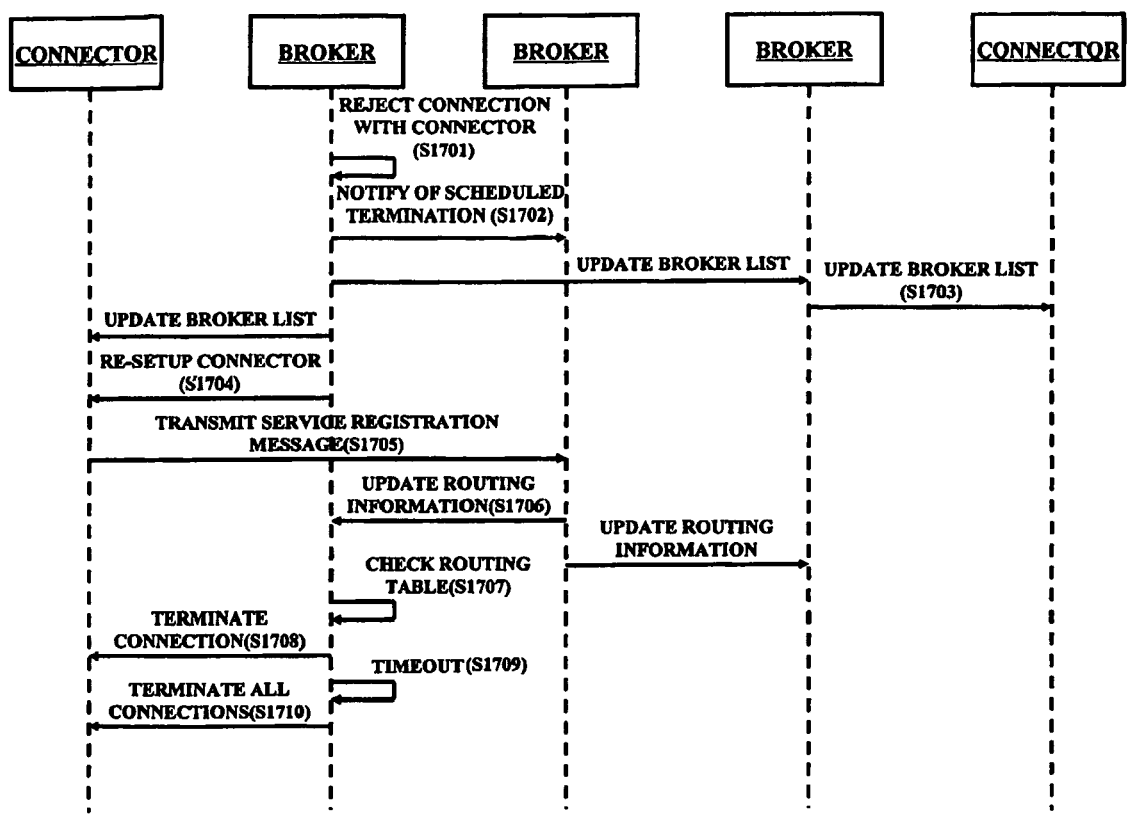
FIG. 17 is a flowchart illustrating a normal termination process of a broker, in an embodiment of the present invention.

FIG. 17 is a flowchart illustrating a normal termination process of a broker, in an embodiment of the present invention.

In step S1701, a broker to be normally terminated sets itself so that a connector may no longer connect to the broker. In step S1702, the broker to be normally terminated notifies other brokers that the broker will be terminated. In step S1703, the terminating broker and other brokers having received the notice notifies the same to connectors connected to the other brokers.

In step S1704, the terminating broker transmits a message to connectors connected to the terminating broker. In this instance, the message is about re-setup of connectors, informing the connectors to move to other broker. In step S1705, connectors having received the message are connected to another broker and transmit a service registration message with respect to services connected to the connectors.

In step S1706, the newly connected broker of connectors from the terminating broker soon updates its routing information and transmits the updated routing information to the terminating broker and other brokers.

In step S1707, the terminating broker updates its routing table by using the transmitted routing information and checks whether the terminating broker's connection with the connector is still included in the routing table of the broker. If not, the connection is terminated in step S1708.

In step S1709, the terminating broker checks whether a predetermined time has passed from a point in time when a message about re-setup of connectors, informing the connectors to move to other broker, is transmitted to the connectors connected to the terminating broker. In step S1710, in the case of having connectors connected to the terminating broker even after the certain time, the terminating broker terminates all connections with the connectors and terminates the broker itself.

Figure 18:
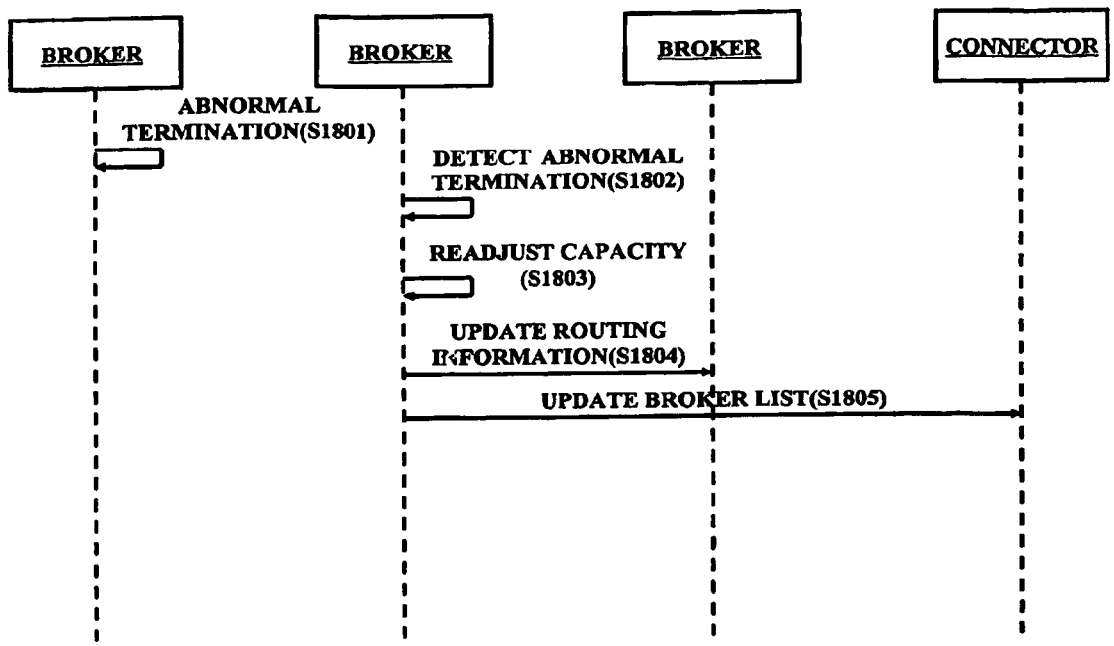
FIG. 18 is a flowchart illustrating a process in the case of other broker detecting abnormal termination of a broker, in an embodiment of the present invention.

FIG. 18 is a flowchart illustrating a process in the case of another broker detecting abnormal termination of a broker, in an embodiment of the present invention.

In step S1801, a broker is abnormally terminated. In this case, in step S1802, another broker detects abnormal termination of the broker. In step S1803, another broker readjusts its maximum capacity.

A maximum number of connectors connectable to one broker, as an example, 50, is the broker's maximum capacity. In the case of another broker detecting abnormal determination of a broker, another broker may increase its maximum number of connectors connectable to one broker to 60, and operate to enable connectors connected to the abnormally terminated broker to quickly move to other brokers and be connected thereto. In this case, a service disconnection time may be significantly reduced.

In step S1804, another broker having detected abnormal termination of the broker updates its routing information and notifies other brokers to update their routing table. In step S1805, other brokers are notified of the abnormal termination of the broker and cause their connectors to update their broker list.

Figure 19:
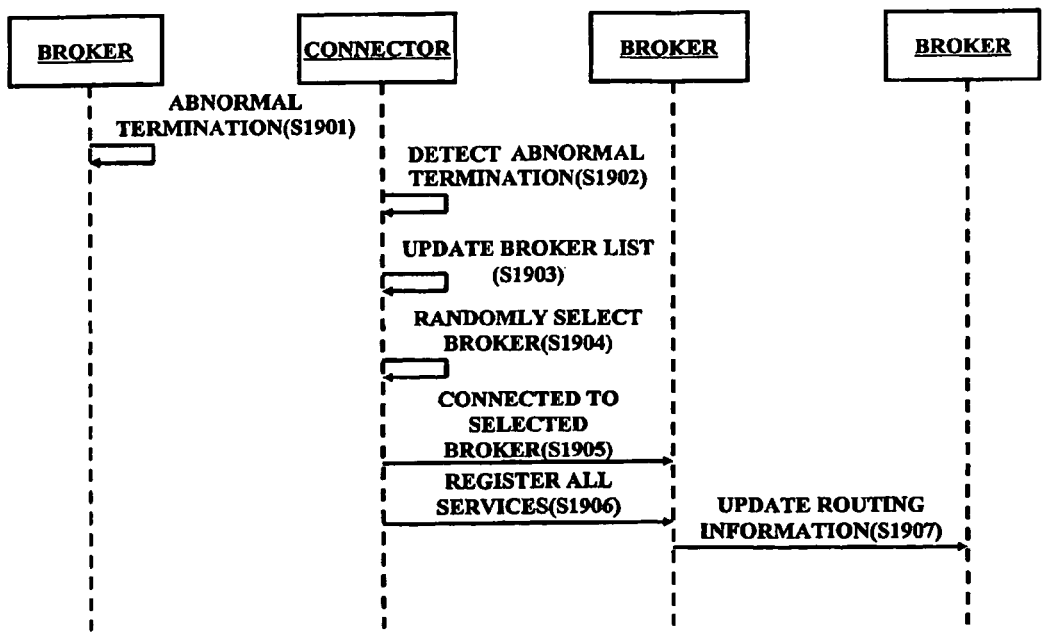
FIG. 19 is a flowchart illustrating a process in the case of a connector detecting abnormal termination of a broker, in an embodiment of the present invention.

FIG. 19 is a flowchart illustrating a process in the case of a connector detecting abnormal termination of a broker, in an embodiment of the present invention.

In step S1901, a broker is abnormally terminated. In this case, in step S1902, a connector connected to the broker detects that the broker connected to the connector is abnormally terminated. In step S1903, the connector deletes the abnormally terminated broker from its broker list.

In step S1904, the connector having deleted the abnormally terminated broker from its broker list randomly selects any one of other brokers from its broker list. In step S1905, the connector is connected to the selected broker. In step S1906, the connector registers all services connected to the connector itself to the selected broker.

In step S1907, the broker with the newly added services transmits its updated routing information to other brokers and notifies the same that the services are registered.

Hereinafter, a structure of a connector which is a subsystem of a communication network system according to the present invention and a function of each component will be described.

Figure 20:
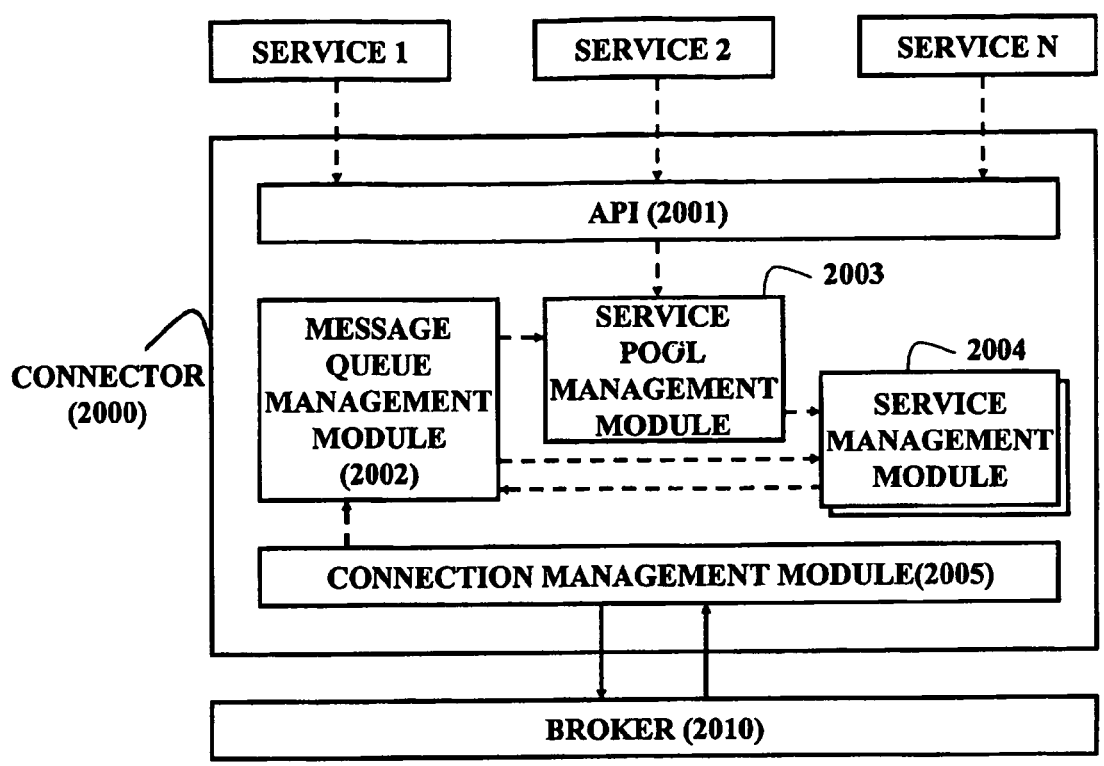
FIG. 20 is a block diagram illustrating a structure of a connector according to the present invention.

FIG. 20 is a block diagram illustrating a structure of a connector according to the present invention.

As illustrated in FIG. 20, a connector 2000 includes an API 2001, a message queue management module 2002, a service pool management module 2003, a service management module 2004 and a connection management module 2005.

The API 2001 is an Application Programming Interface which exposes a function of the connector 2000 to a service connected to the connector 2000. A system that wants to utilize an MRS network according to the present invention uses the API 2001 and transmits/receives data.

Figure 21:
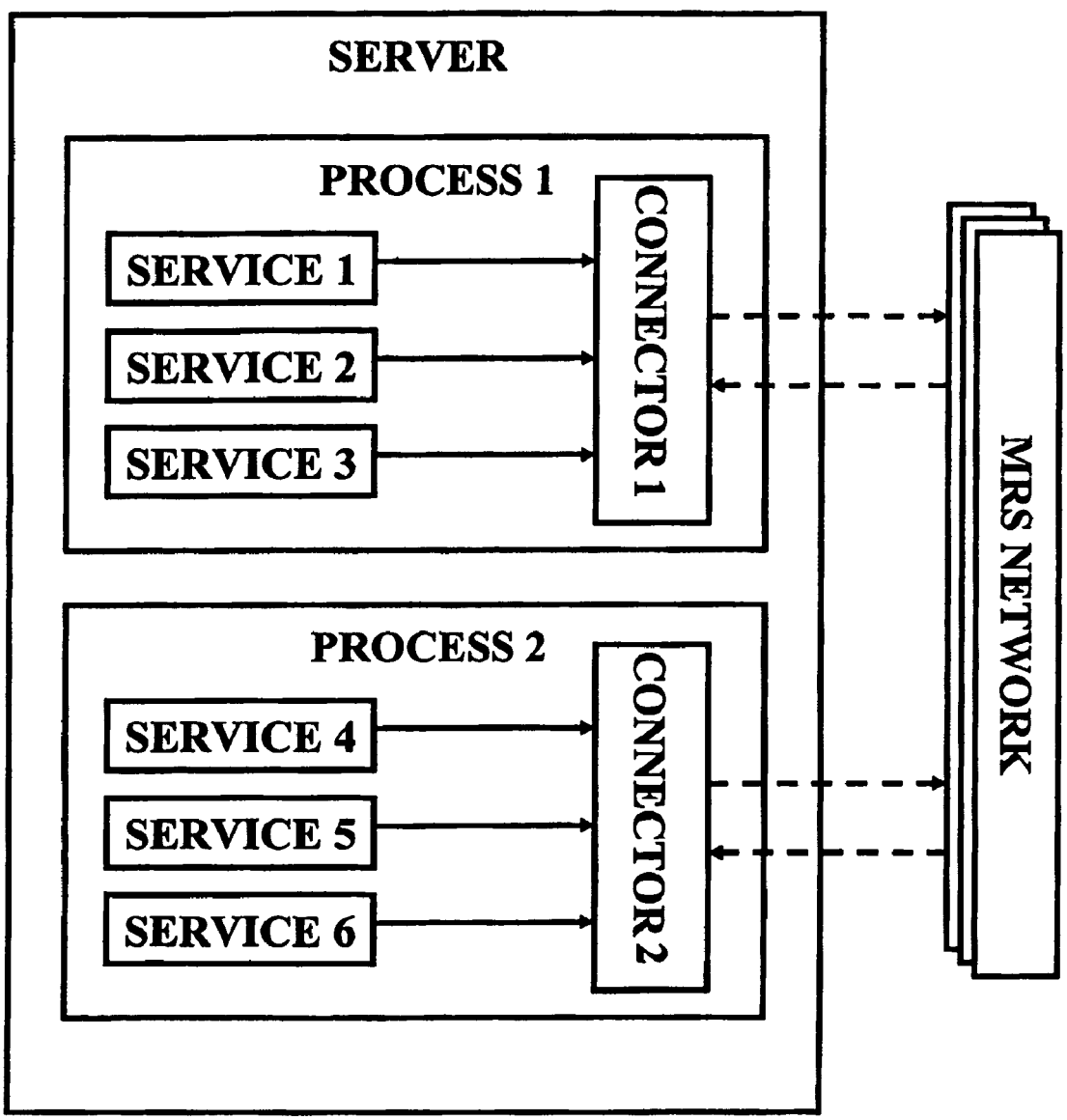
FIG. 21 is a diagram illustrating an Application Programming Interface (API) which is programming interface provided from a connector according to the present invention.

FIG. 21 is a diagram for explaining the API 2001 and a relationship with respect to a process of a service and a connector.

As illustrated in FIG. 21, according to an embodiment of the present invention, a connector and a service are contained in an identical process. Only one connector may be contained in one process and at least one service may be contained in one process. Namely, one connector is contained in each process and the connector may mediate a connection between all services connected to the connector and the broker constructing an MRS network.

According to the present embodiment, a communication network system may be unified by matching a connector and a process 1:1. Also, inefficient routing may be prevented. In this instance, the inefficient routing occurs when connecting services contained in different processes to the same broker via one connector. Also, complexity in transmitting/receiving data may be prevented.

As illustrated in FIG. 21, at least one service contained in one process may be connected to an MRS network via one connector 2000. In this case, a connection and data transmitting/receiving between services and the connector 2000 may be performed via the API 2001.

Namely, to transmit/receive data by using the MRS network, the service may not directly set up a connection with the MRS network to transmit/receive data. The service transmits/receives data by using the API 2001 provided from the connector 2000. As a result, the API 2001 receives a request for registration or cancellation of a service, and a request for transmission of data to the broker 2010, from the service.

The connector 2000 is a module for providing the API 2001. Also, the connector 2000 is loaded in each process using the MRS network and functions to transmit/receive a message to the MRS network, with respect to all services generated in a corresponding process.

The message queue management module 2002 functions to manage an MRP packet used in the MRS network according to the present invention. In this instance, the MRP packet is a unit of data transmitted/received between the connector 2000 and the broker 2010.

Figure 22:
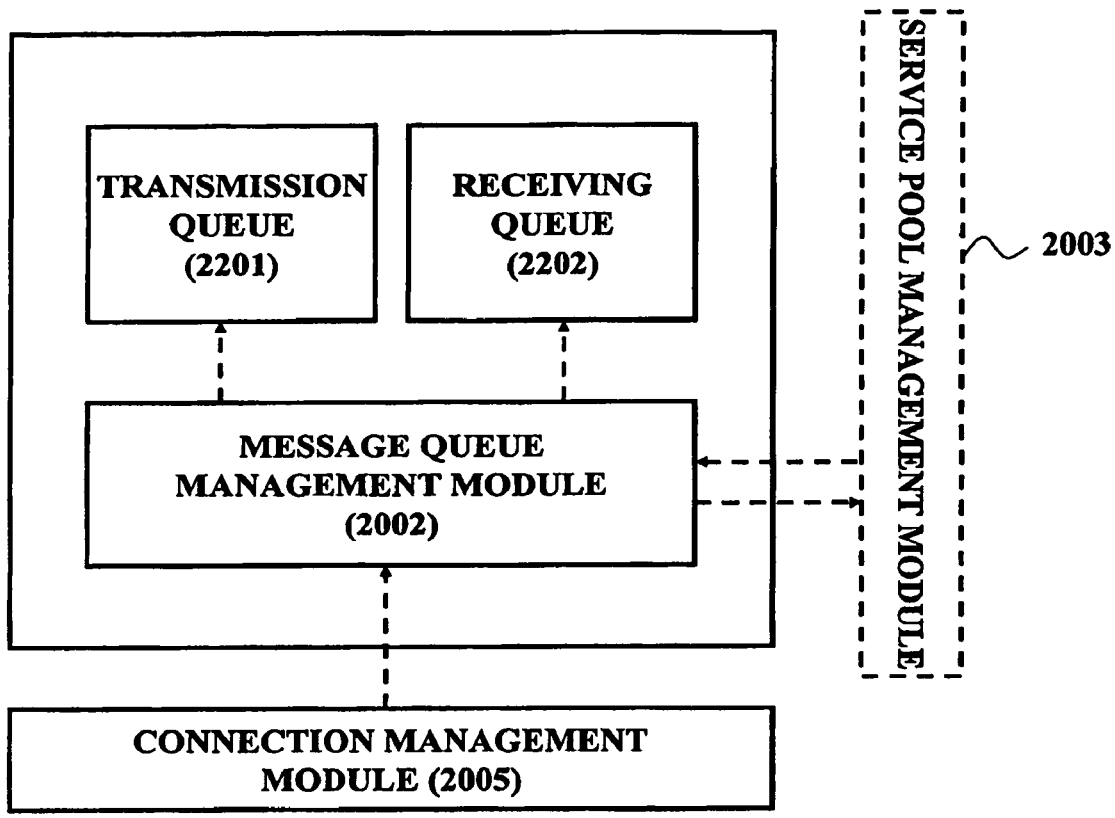
FIG. 22 is a block diagram illustrating a structure of a message queue management module which is one component of a connector according to the present invention.

FIG. 22 is a block diagram illustrating a structure of the message queue management module 2002.

As illustrated in FIG. 22, the message queue management module 2002 may include a transmission queue 2201 and a receiving queue 2202.

In this instance, the transmission queue 2201 functions to manage an MRP packet to be transmitted to the broker 2010, and the receiving queue 2202 functions to manage an MRP packet received from the broker 2010.

The service pool management module 2003 functions to register a service in the broker 2010 or remove the service from the broker, and to manage the registered service. The service management module 2004 functions to manage information on the registered service.

Figure 23:
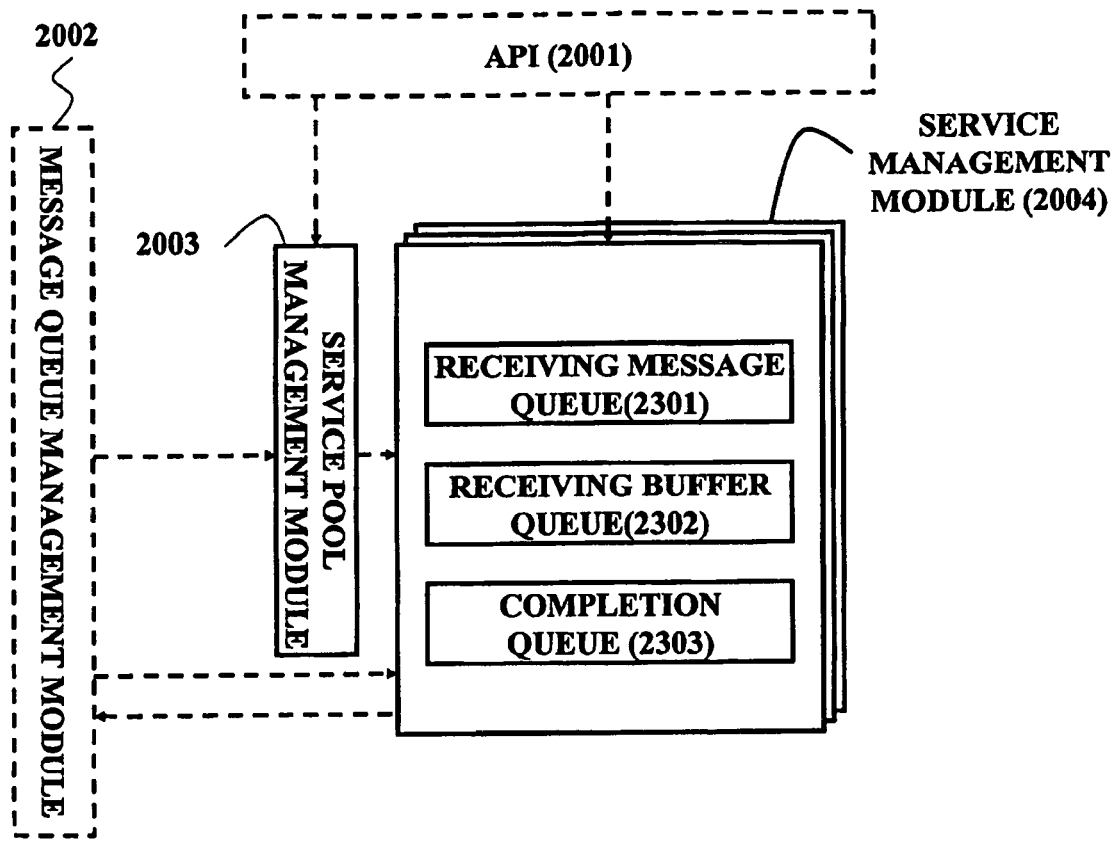
FIG. 23 is a block diagram illustrating a structure of a service management module which is one component of a connector according to the present invention.

FIG. 23 is a block diagram illustrating a structure of the service management module 2004.

As illustrated in FIG. 23, the service management module 2004 may include a receiving message queue 2301, a receiving buffer queue 2302 and a completion queue 2303.

In this instance, the receiving message queue 2301 functions to manage a received message from the broker 2010. The receiving buffer queue 2302 functions to manage a receiving buffer registered by the service. The completion queue 2303 functions to manage completed results with respect to input/output requested from the service.

The connection management module 2005 functions to transmit/receive an MRP packet and manage a socket connection with the broker 2010.

Figure 24:
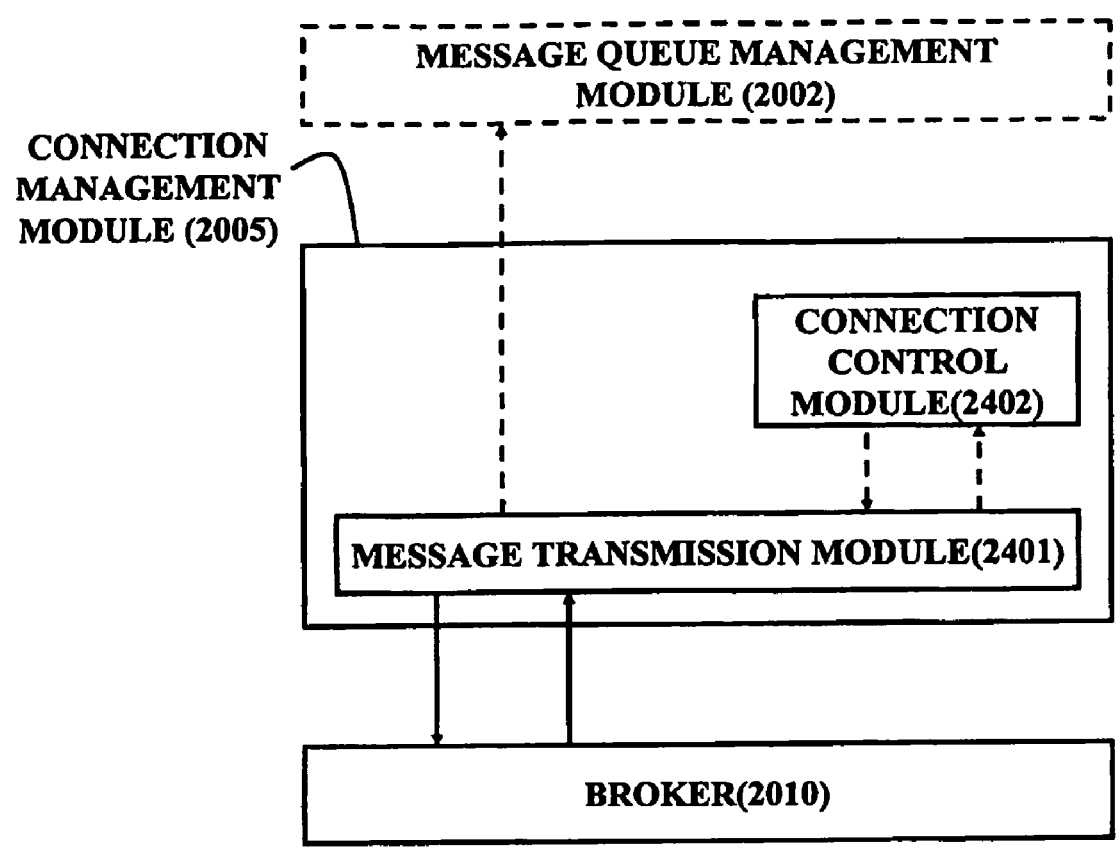
FIG. 24 is a block diagram illustrating a structure of a connection management module which is one component of a connector according to the present invention.

FIG. 24 is a block diagram illustrating a structure of the connection management module 2005.

As illustrated in FIG. 24, the connection management module 2005 may include a message transmission module 2401 and a connection control module 2402.

In this instance, the message transmission module 2401 functions to load an MRP packet to be transmitted from the message queue management module 2002 and transmit the same to the broker 2010 and to transfer an MRP packet received from the broker 2010 to the message queue management module 2002. Also, the connection control module 2402 functions to process a control message between the connector 2000 and the broker 2010 and control a connection therebetween.

Hereinafter, a structure of a broker, which is another subsystem of a communication network system according to the present invention, and a function of each component will be described.

Figure 25:
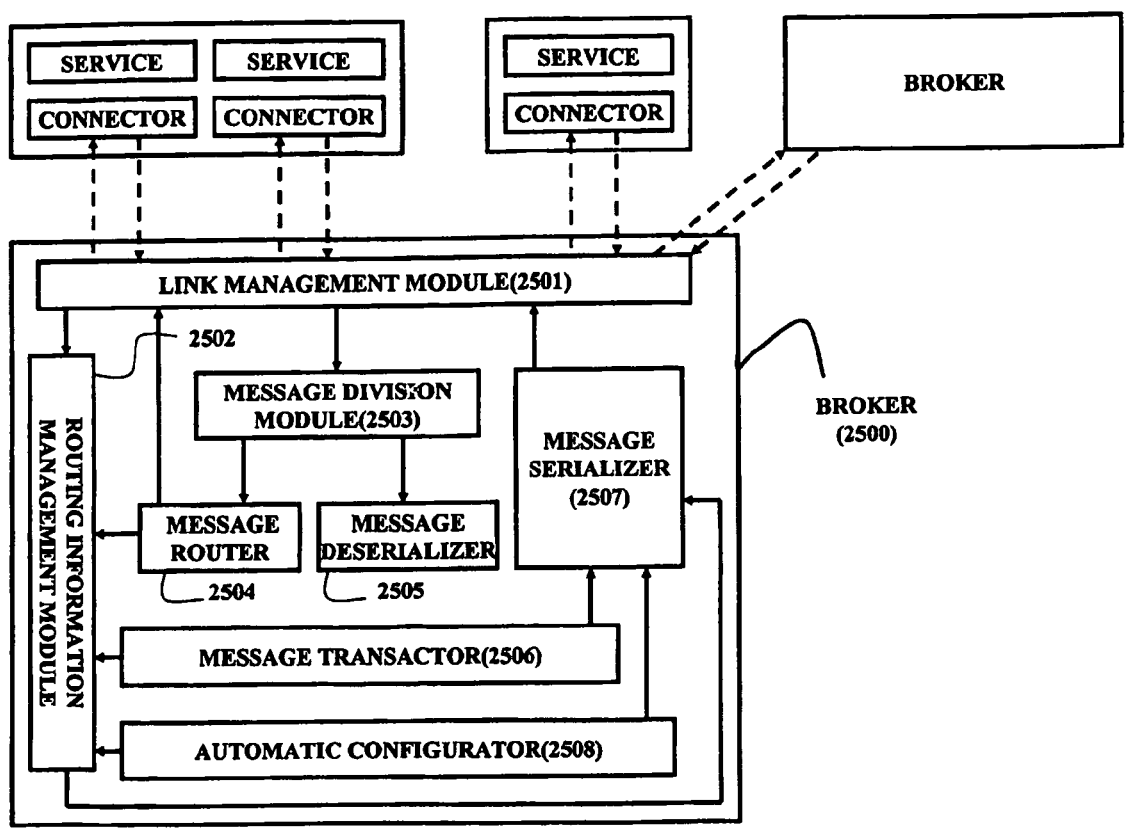
FIG. 25 is a block diagram illustrating a structure of a broker according to the present invention.

FIG. 25 is a block diagram illustrating a structure of a broker.

As illustrated in FIG. 25, a broker 2500 may include a link management module 2501, a routing information management module 2502, a message division module 2503, a message router 2504, a message deserializer 2505, a message transactor 2506, a message serializer 2507 and an automatic configurator 2508.

The link management module 2501 functions to maintain and manage a connection with a connector or other broker, and also to transmit/receive data with the connector or other broker.

The routing information management module 2502 functions to maintain and manage routing information of a service registered in the broker 2500. Also, the routing information management module 2502 may maintain a connection pool including connection information with a connector connected to the broker 2500 or other brokers.

The message division module 2503 functions to understand a type of data received in the link management module 2501 and divide the received data into a simple message and a complex message according to a predetermined standard.

The message router 2504 functions to receive the simple message from the message division module 2503, obtain location information of a destination associated with the simple message, from the routing information management module 2502, and transfer the obtained location information to the link management module 2501.

The message deserializer 2505 functions to receive the complex message from the message division module 2501 and convert the received complex message into an object.

The message transactor 2506 functions to receive the object from the message deserializer 2505 and control the broker 2500 by using the object.

The message serializer 2507 functions to receive the object from the message transactor 2506, process the object into transmittable linear data, and transfer the same to the link management module 2501.

The automatic configurator 2508 functions to track a status of a network containing the broker 2500 and automatically adjust the status of the broker 2500.

Figure 26:
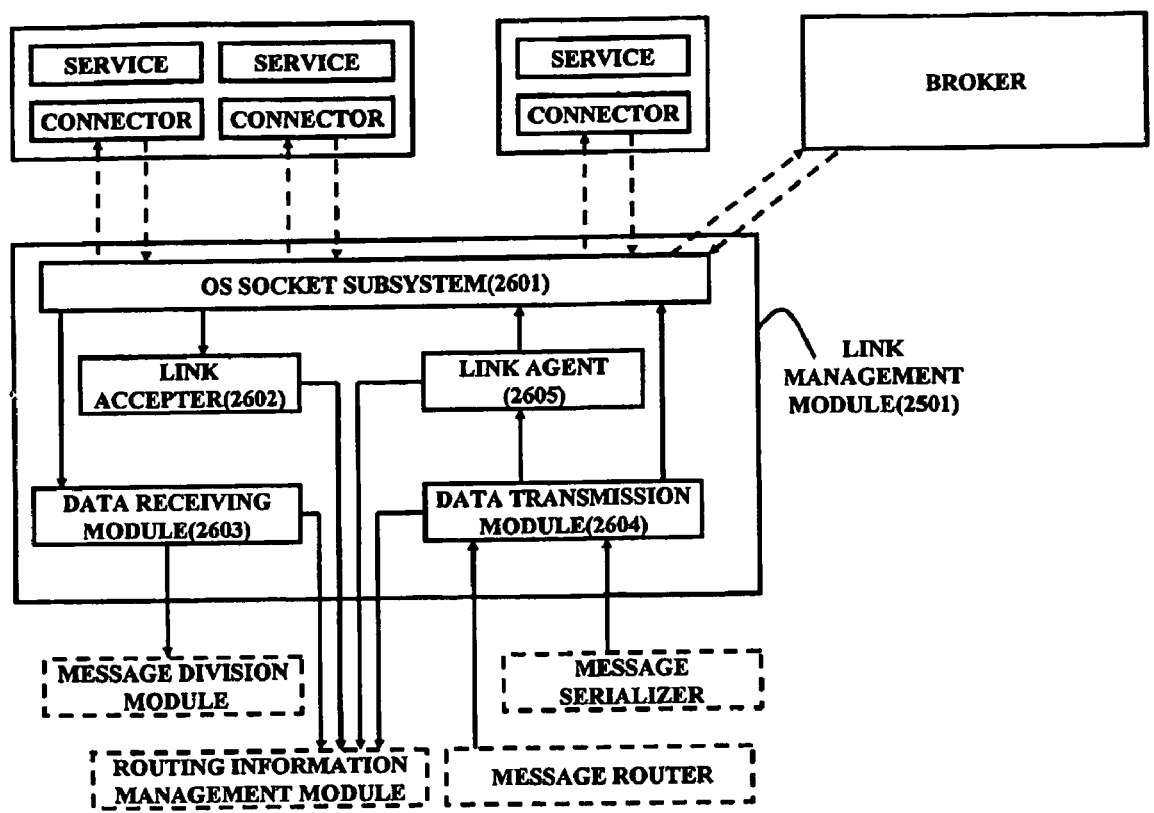
FIG. 26 is a block diagram illustrating a structure of a link management module which is one component of a broker according to the present invention.

FIG. 26 is a block diagram illustrating a structure of the link management module 2501.

As illustrated in FIG. 26, the link management module 2501 may include an OS socket subsystem 2601, a link accepter 2602, a data receiving module 2603, a data transmission module 2604 and a link agent 2605.

The OS socket subsystem 2601 functions as interface for transmitting/receiving data with a connector connected to the broker 2500 or other broker.

The link accepter 2602 functions to receive a connection request from the connector connected to the broker 2500 or other broker via the OS socket subsystem 2601 and record connection information according to the connection request in the connection pool maintained by the routing information management module 2502.

The data receiving module 2603 functions to receive data from the connector connected to the broker 2500 or other brokers and transfer the data to the message division module 2503.

The data transmission module 2604 functions to receive processed data from the message serializer 2507 and transmit the processed data to the connector connected to the broker 2500 or other brokers.

The link agent 2605 functions to attempt a connection with the connector connected to the broker 2500 or another broker via the OS socket subsystem 2601 according to a request from the data transmission module 2604, and in the case of a successful connection, update the connection pool maintained by the routing information management module 2502 by using connection information.

Also, the data transmission module 2604 may check whether a connection with another broker or a connector associated with a destination of data to be transmitted is set up by referring to the connection pool. In the case the connection not set up, the data transmission module 2604 may operate to attempt data transmission after requesting the link agent 2605 to set up a connection with a connector connected to the broker or another broker.

The method for transmitting/receiving data in a communication network according to the present invention includes computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Industrial Applicability

A communication network system and a data transmitting/receiving method using the same according to the present invention can simplify a connection structure between servers via a bus network structure and support service extendibility and performance extendibility, and also can easily maintain and manage the connection structure.

Also, a communication network system and a data transmitting/receiving method using the same according to the present invention can suggest a new communication structure that can deviate from a network structure according to the conventional art connecting all game servers in a full mesh topology, simplify and easily manage a connection structure between servers, and efficiently extend services.

The invention claimed is:

1. A communication network system in a bus network structure, the system comprising:
   a plurality of brokers in a network;
   a plurality of connectors in the network: and
   a plurality of service terminal nodes in the network,
   wherein each of the service terminal nodes is connected to one of the brokers via one of the connectors,
   wherein the connectors are configured to mediate connections between the service terminal nodes and the brokers, each of the connectors being connected to only one broker,
   wherein the brokers are configured to route a message between any pair of the service terminal nodes, and all of the brokers are connected to each other in a full mesh topology, and
   wherein one or more different service terminal nodes are contained in one process, and only one connector exists in the one process to connect with the one or more different service terminal nodes.

2. The system of claim 1, wherein the only one connector existing in the one process is directly connected with the one or more different service terminal nodes.

3. The system of claim 2, wherein at least one service is contained in the one process.

4. The system of claim 1, wherein a first connector comprises:
   an Application Programming Interface (API) configured to expose a function provided by the first connector to a first service terminal node;
   a message queue management module configured to manage a transmitted/received Message Routing Protocol (MRP) packet, the MRP packet being a unit of data transmitted/received between the first connector and a first broker;
   a service pool management module configured to register the first service terminal node in the first broker or to remove the first service terminal node from the first broker, and to manage the registered first service terminal node;
   a service management module configured to manage information on the registered service; and
   a connection management module configured to transmit/receive the MRP packet and to manage a socket connection with the first broker.

5. The system of claim 4, wherein the API is configured to receive a request for registration of the first service terminal node or removal thereof and a request for transmission of data to the first broker, from the first service terminal node.

6. The system of claim 4, wherein the message queue management module comprises:
   a transmission queue configured to manage an MRP packet to be transmitted to the first broker; and
   a receiving queue configured to manage an MRP packet received from the first broker.

7. The system of claim 4, wherein the service management module comprises:
   a received message queue configured to manage a message received from the first broker;
   a receiving buffer queue configured to manage a receiving buffer registered by the first service terminal node; and
   a completion queue configured to manage completed results with respect to an input/output requested by the first service terminal node.

8. The system of claim 4, wherein the connection management module comprises:
   a message transmission module configured to load an MRP packet to be transmitted from the message queue management module, to transmit the loaded MRP packet to the first broker, and to transfer an MRP packet received from the first broker to the message queue management module; and
   a connection control module configured to process a control message between the first connector and the first broker.

9. The system of claim 1, wherein a first broker comprises:
   a link management module configured to maintain and manage a connection with a first connector or other broker, and to transmit/receive data with the first connector or other broker;
   a routing information management module configured to maintain and manage routing information of service terminal nodes registered in the first broker;
   a message division module configured to determine a type of data received in the link management module and to divide the received data into a simple message and a complex message according to a message division rule;
   a message router configured to receive the simple message from the message division module, to obtain location information of a destination associated with the simple message, from the routing information management module, and to transfer the obtained location information to the link management module;
   a message deserializer configured to receive the complex message from the message division module and to convert the received complex message into an object;
   a message transactor configured to receive the object from the message deserializer and to control the first broker by using the object;
   a message serializer configured to receive the object from the message transactor, to process the object into transmittable linear data, and to transfer the same to the link management module; and
   an automatic configurator configured to track a status of a network containing the first broker and automatically adjusting the status of the first broker.

10. The system of claim 9, wherein:
    the routing information management module is configured to maintain a connection pool comprising connection information with the first connector connected to the first broker or with another broker, and the link management module comprises:
    a link accepter configured to receive a connection request from the first connector or another broker and to record connection information in the connection pool;
    a data receiving module configured to receive data from the first connector or another broker and transfer the data to the message division module;

a data transmission module configured to receive processed data from the message serializer and to transmit the processed data to the first connector or another broker; and a link agent configured to attempt a connection with the first connector or another broker according to a request from the data transmission module, and in the case of a successful connection, to update the connection pool.

11. The system of claim 10, wherein the data transmission module is configured to check whether the connection with the first connector or another broker associated with a destination of data to be transmitted is set up by referring to the connection pool and to request, in the case the connection is not set up, the link agent to set up the connection with the first connector or another broker and attempt data transmission.

12. The system of claim 1, wherein:

the service terminal node transmits a service registration message to the connector, the connector analyzes the service registration message and checks whether the service terminal node is pre-registered, and in the case the service terminal node is not pre-registered, transferring the service registration message to the broker, and the broker adds routing information, of the service terminal node having transmitted the service registration message, to its routing table and transmits the routing information to other brokers.

13. The system of claim 1, wherein:

the service terminal node transmits a service cancellation message to the connector, the connector analyzes the service cancellation message, checks whether the service cancellation message is a final cancellation, and in the case of the final cancellation, transfers the service cancellation message to the broker, the broker deletes routing information of the service terminal node that has transmitted the service cancellation message, from its routing table, and informs other brokers of the deletion of the routing information.

14. The system of claim 1, wherein a first connector is configured to register in a first broker an address of a first service terminal node, such that a second service terminal node transmits data to the registered address through the first broker.

* * * * *

UNITED STATES PATENT AND TRADEMARK OFFICE
CERTIFICATE OF CORRECTION

| | | |
|---|---|---|
| PATENT NO. | : 8,346,892 B2 | Page 1 of 1 |
| APPLICATION NO. | : 11/721396 | |
| DATED | : January 1, 2013 | |
| INVENTOR(S) | : Kyoung Wook Chun | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1333 days.

Signed and Sealed this
Eighth Day of July, 2014

Michelle K. Lee
*Deputy Director of the United States Patent and Trademark Office*